United States Patent [19]
Woodward et al.

[11] Patent Number: 6,054,697
[45] Date of Patent: Apr. 25, 2000

[54] PIZZA PAN SHIELDING SYSTEMS AND METHODS

[75] Inventors: Steven J. Woodward, McKinney; David Z. Ovadia, Coppell; Larry B. Johnson, Plano; Malcolm F. Dyer, Addison; Dana R. Reynolds, Rowlell, all of Tex.

[73] Assignee: Pizza Hut, Inc., Dallas, Tex.

[21] Appl. No.: 09/121,956

[22] Filed: Jul. 24, 1998

Related U.S. Application Data

[60] Provisional application No. 60/053,102, Jul. 26, 1997.
[51] Int. Cl.[7] .................................................. H05B 6/80
[52] U.S. Cl. ........................ 219/729; 219/725; 219/734; 219/680; 99/DIG. 14; 426/243; 426/107
[58] Field of Search ................................ 219/729, 734, 219/735, 728, 736, 745, 621, 601, 680, 681, 682, 725; 99/DIG. 14, 451; 426/107, 109, 113, 234, 237, 241, 243

[56] References Cited

U.S. PATENT DOCUMENTS

| | | |
|---|---|---|
| 33,444 | 10/1861 | Miller . |
| 868,312 | 10/1907 | Wilcox . |
| 1,411,128 | 3/1922 | Strobhart . |
| 2,583,887 | 1/1952 | Schneeweiss . |
| 3,219,460 | 11/1965 | Brown . |
| 3,302,632 | 2/1967 | Fichtner . |
| 3,431,836 | 3/1969 | Murrell . |
| 3,615,713 | 10/1971 | Stevenson . |
| 3,910,548 | 10/1975 | Giesfeldt . |
| 3,987,719 | 10/1976 | Kian . |

(List continued on next page.)

FOREIGN PATENT DOCUMENTS

| | | |
|---|---|---|
| 3-196611 | 8/1991 | Japan . |
| 4-19992 | 1/1992 | Japan . |
| WO 92/19515 | 11/1992 | WIPO . |

OTHER PUBLICATIONS

Copson, D.A., Ph.D., "Microwave Heating," The AVI Publishing Company, Inc., 1975, pp. 300–301.

Moore, Karen, "Microwave Technology Points to Creative Routes for New Product Ideas, Developments," Food Product Development, Jul., 1979, pp. 36–37.

Ho, Y.C., et al., "Effect of Metal Shielding on Microwave Heating Uniformity of a Cylindrical Food Model," Journal of Food Processing and Preservation, vol. 16, 1992, pp. 337–359.

Buffler, C.R., Ph.D., "Microwave Cooking and Processing," Van Nostrand Reinhold, 1993.

Anantheswaran, R.C., et al., "Effect of Electrical Shielding on Time–Temperature Distribution and Flow Profiles in Water in a Cylindrical Container During Microwave Heating," Journal of Microwave Power and Electromagnetic Energy, vol. 29, No. 4, 1994, pp. 220–230.

Yang, A.P.P., et al., "Effectiveness of Metallic Shielding in Improving the Uniformity of Microwave Heating," Proceedings of 33rd Microwave Power Symposium, Chicago, IL, 1998, pp. 90–92.

*Primary Examiner*—Philip H. Leung
*Attorney, Agent, or Firm*—Patterson & Keough, P.A.

[57] ABSTRACT

Pizza pan shielding systems and methods generally include one or more of the following: a pan, a bottom shield, a top shield, and a ring shield. Each of these elements preferably incorporates a plurality of perforations. The size, location and density of these perforations, and/or the material makeup of the element(s), determine whether certain types of baking energy from various heat sources will reach a food item located within the system. Substantial evenness of cooking results, in a short time period and at reasonably baking temperatures. Embodiments of the invention address the problems of underbaking in central areas of the food item and overbaking, dryness, microwave-induced toughness or burning of outer areas of the food item, such as a crust area. Embodiments of the invention have particular, though not exclusive, application to the pizza-baking devices and methods.

28 Claims, 20 Drawing Sheets

U.S. PATENT DOCUMENTS

| | | |
|---|---|---|
| 4,013,798 | 3/1977 | Goltsos . |
| 4,065,583 | 12/1977 | Ahlgren . |
| 4,176,591 | 12/1979 | Power . |
| 4,184,421 | 1/1980 | Ahlgren . |
| 4,196,331 | 4/1980 | Leveckis et al. . |
| 4,268,738 | 5/1981 | Flautt, Jr. et al. . |
| 4,367,243 | 1/1983 | Brummett et al. . |
| 4,378,729 | 4/1983 | Pierick . |
| 4,384,513 | 5/1983 | Pierick . |
| 4,406,218 | 9/1983 | Hatakeyama . |
| 4,464,406 | 8/1984 | Pierick . |
| 4,481,392 | 11/1984 | Nibbe et al. . |
| 4,499,356 | 2/1985 | Hatagawa . |
| 4,563,946 | 1/1986 | Barlow et al. . |
| 4,649,053 | 3/1987 | Lamonica . |
| 4,676,151 | 6/1987 | Gorsuch et al. . |
| 4,677,905 | 7/1987 | Johnson . |
| 4,689,458 | 8/1987 | Levendusky et al. . |
| 4,703,148 | 10/1987 | Mikulski et al. . |
| 4,763,639 | 8/1988 | Goldsworthy . |
| 4,800,865 | 1/1989 | Setzer . |
| 4,911,634 | 3/1990 | Keener . |
| 4,927,991 | 5/1990 | Wendt et al. . |
| 5,019,680 | 5/1991 | Morino et al. . |
| 5,036,179 | 7/1991 | Westerberg et al. . |
| 5,097,753 | 3/1992 | Naft . |
| 5,272,299 | 12/1993 | Ovadia . |
| 5,272,302 | 12/1993 | Dudley et al. .......................... 219/729 |
| 5,288,962 | 2/1994 | Lorence et al. . |
| 5,331,135 | 7/1994 | Ovadia . |
| 5,365,833 | 11/1994 | Chen . |
| 5,503,063 | 4/1996 | Sebald . |
| 5,517,005 | 5/1996 | Westerberg et al. . |
| 5,519,195 | 5/1996 | Keefer et al. . |
| 5,523,104 | 6/1996 | Kirk . |
| 5,526,735 | 6/1996 | Hacker et al. . |
| 5,558,798 | 9/1996 | Tsai . |
| 5,736,713 | 4/1998 | Westerberg . |

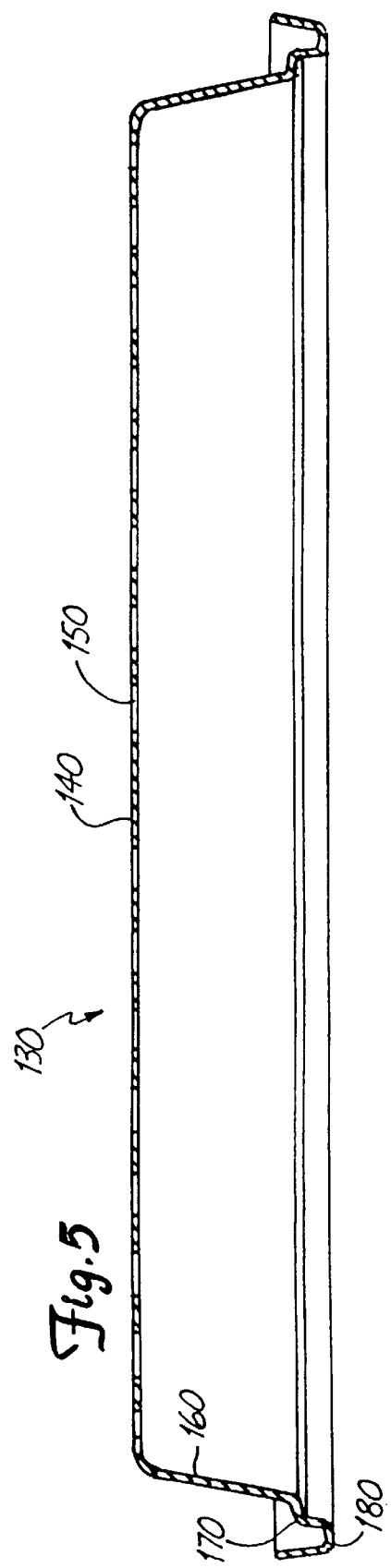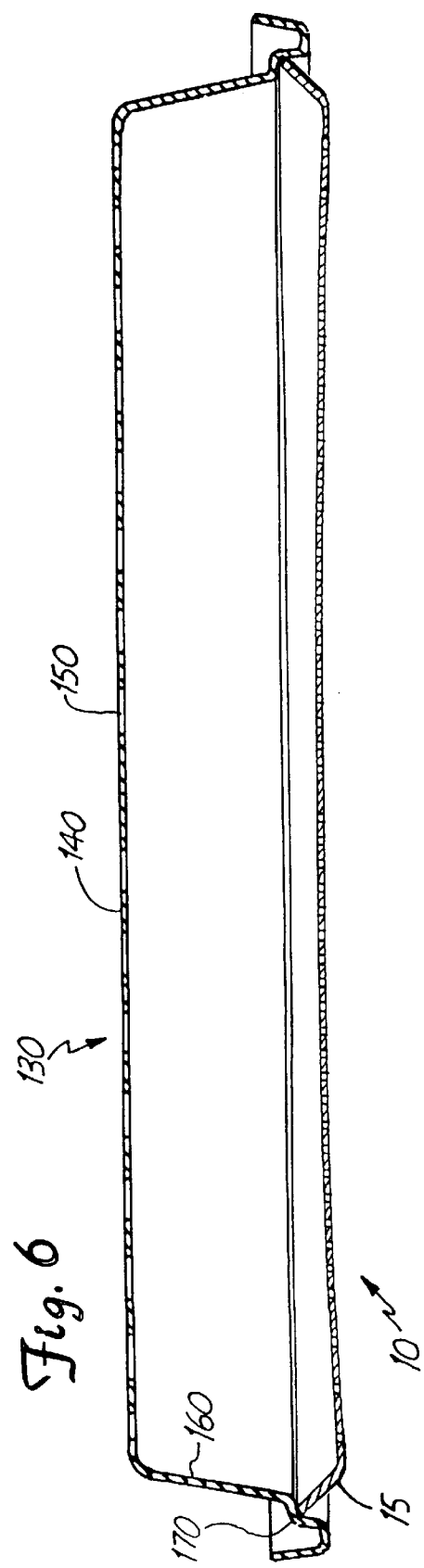

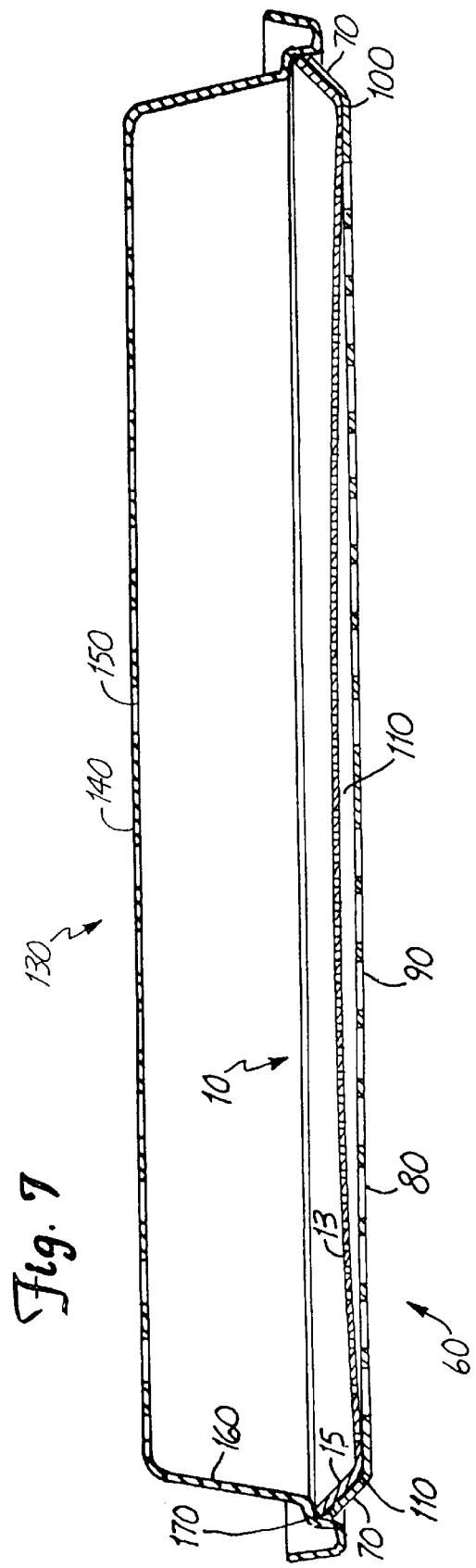

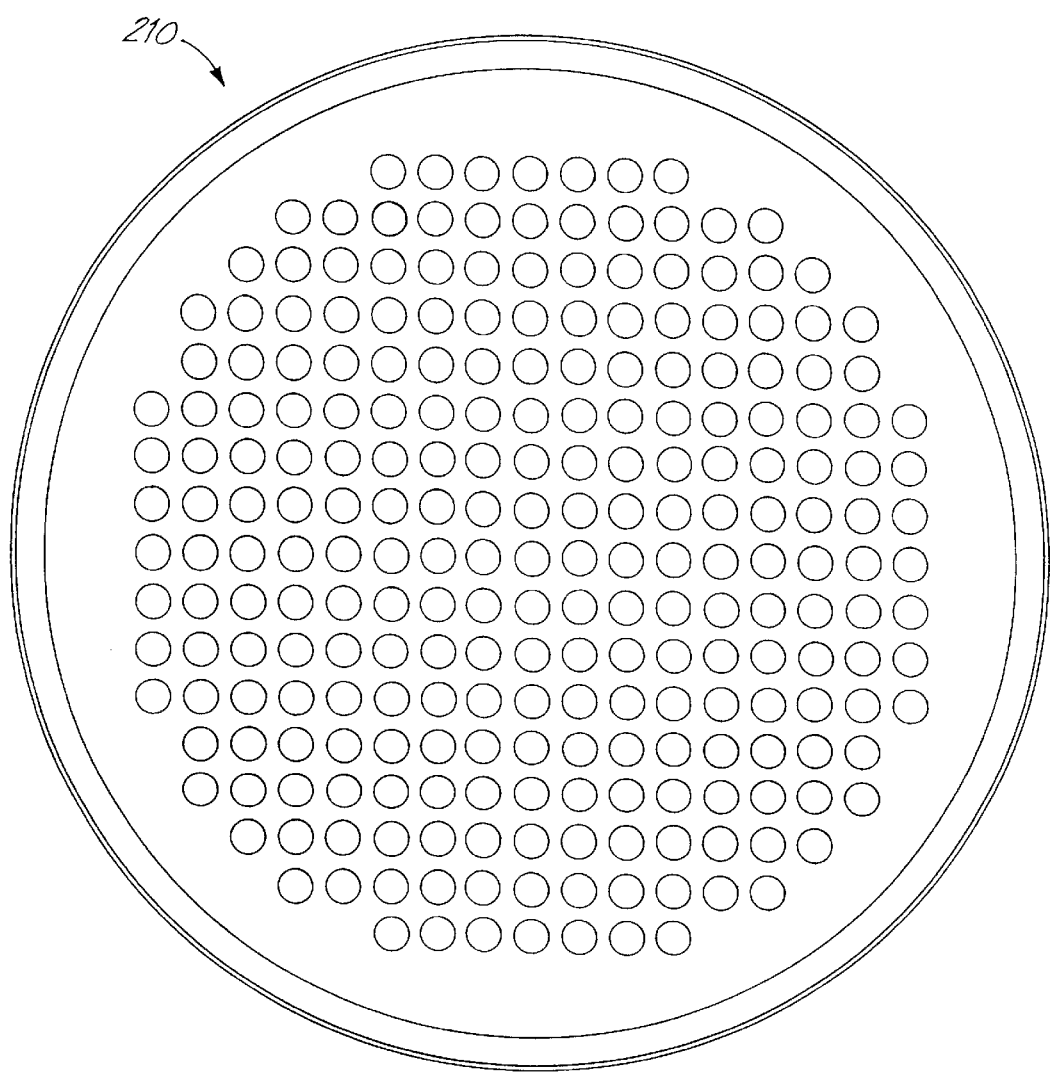

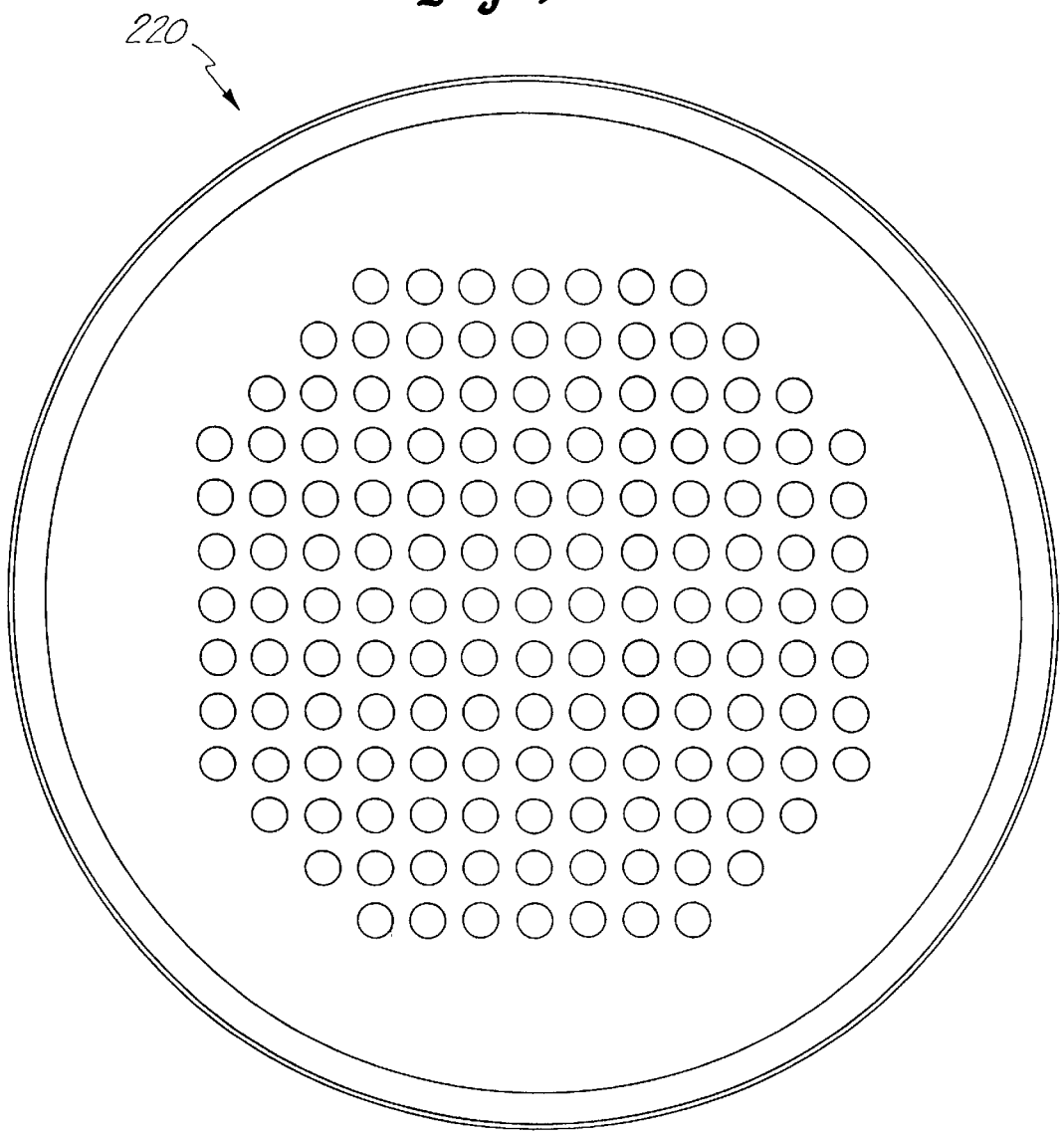

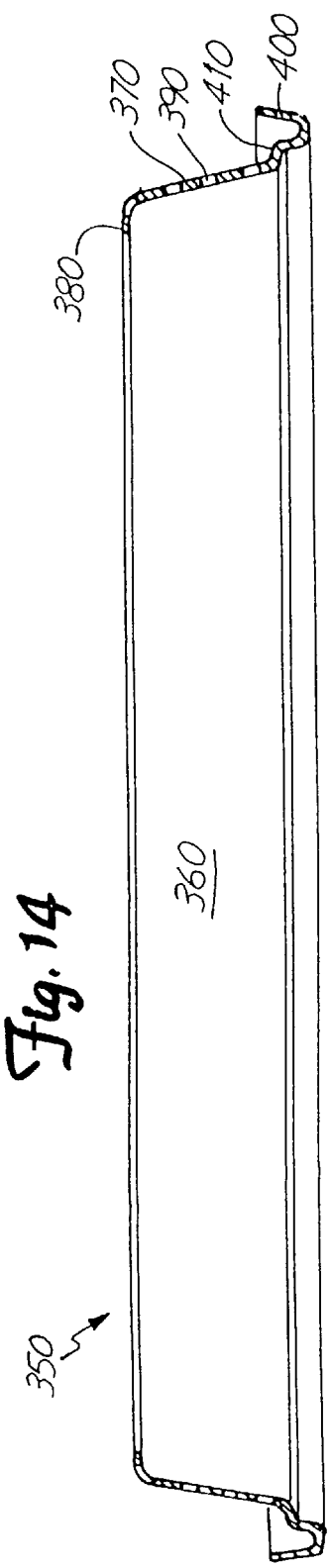
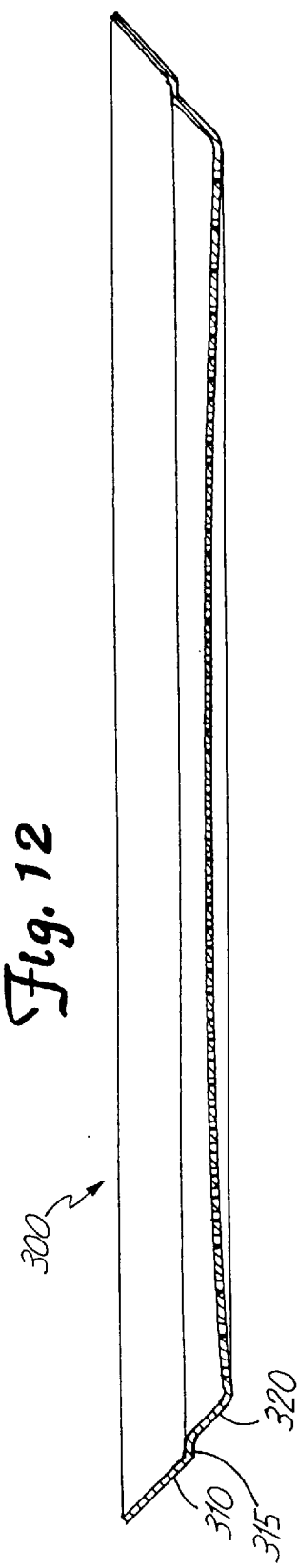

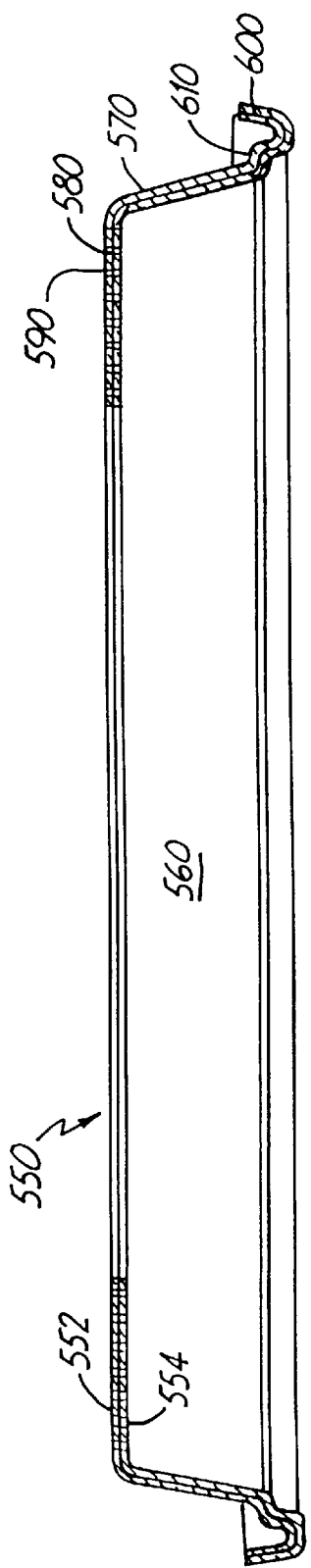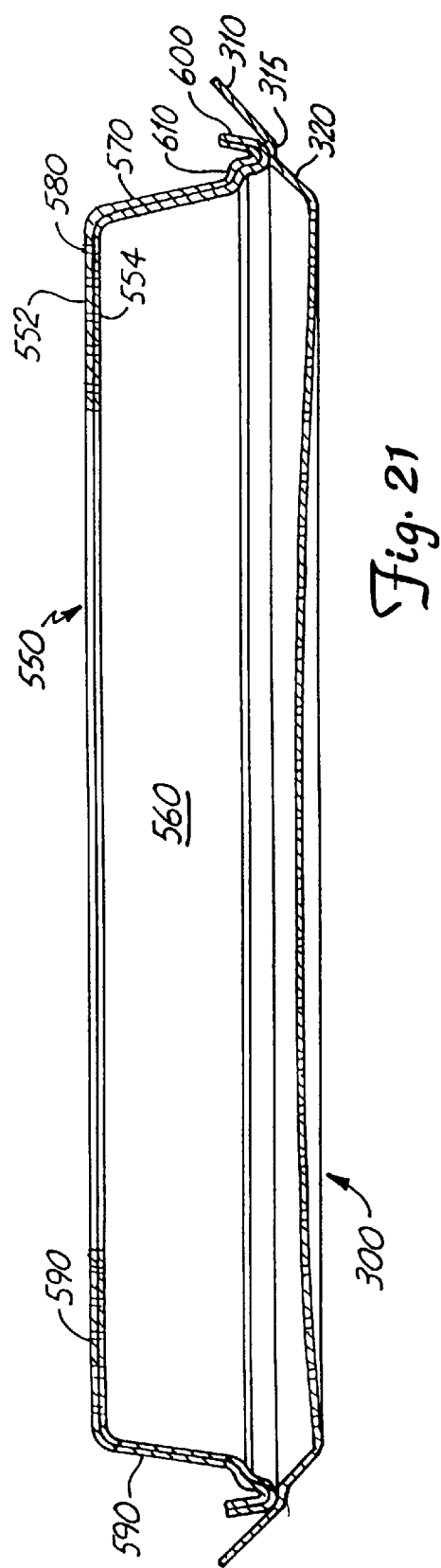

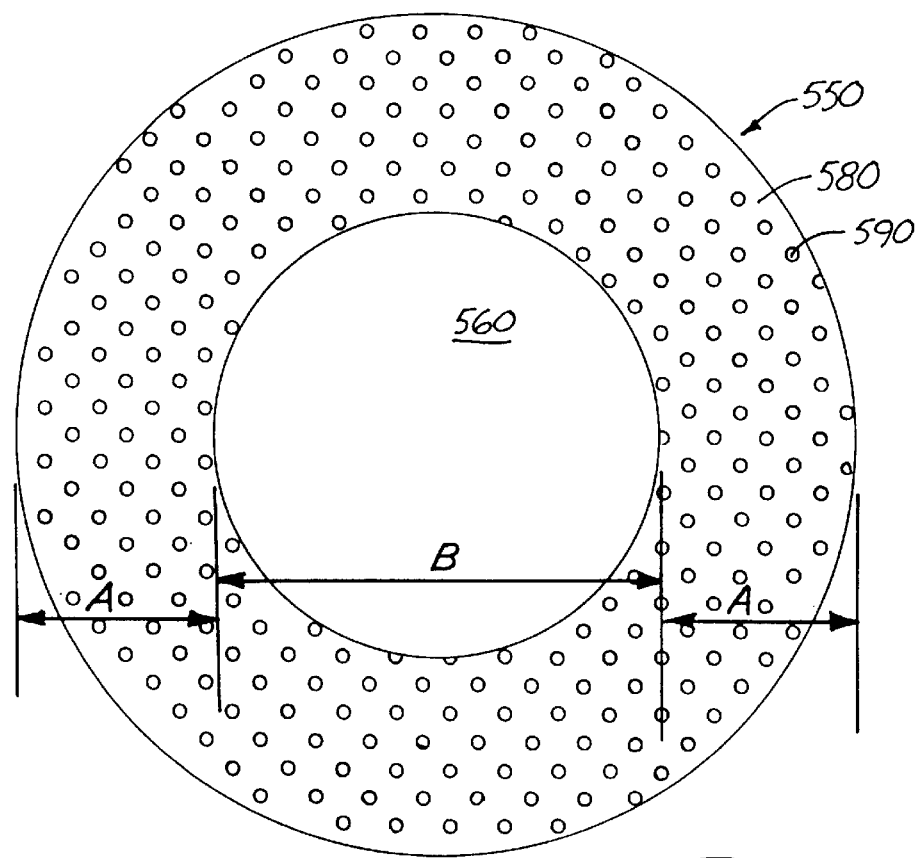
Fig. 22
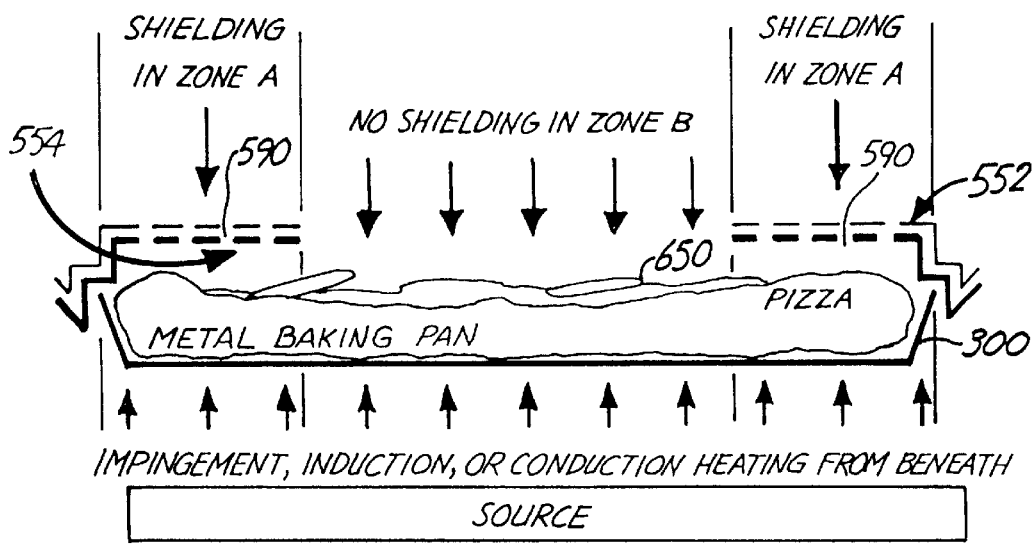

PIZZA PAN SHIELDING SYSTEMS AND METHODS

CROSS-REFERENCE TO RELATED APPLICATION

The subject matter of this application is related to the subject matter of commonly assigned U.S. application Ser. No. 60/053,102, filed Jul. 26, 1997, which is incorporated by reference herein in its entirety and priority to which is claimed under 35 U.S.C. § 119(e).

BACKGROUND OF THE INVENTION

1. Field of the Invention

The invention relates to the baking of food items, and more specifically, to controlling the types and amounts of baking energy that may reach a food item in a certain period of time.

2. Description of Related Art

Commercial food items, such as pizza products, often are baked in a metal pan that is subjected to substantial heating or baking energy. The baking energy often is supplied from both above and below the pizza by separate means, such as upper and lower sets of impinging jets of gas, such as air or superheated steam, or less rigorous means of convection heat, to name several examples of more traditional thermal-energy transfer. In the case of substantially flat, substantially planar food products such as pizza, such heat transfer generally is considered more effective if the heat is directed toward the product in a direction generally perpendicular to the plane in which the product lies. As will be described, other types of heating are also known in the art, e.g. electromagnetic radiation such as microwaves, infrared rays, and intense light within the visible spectrum, e.g. as in FLASHBAKE ovens manufactured by Quadlux, Inc., Fremont, Calif. U.S. Pat. Nos. 5,736,713 and 5,036,179 to Quadlux, incorporated herein by reference, disclose intense-light heating devices.

Heating a pizza or other food product from below often is achieved by thermal conduction through a metal pan base while the pizza is baking. Heat can be supplied to the bottom surface of the pan via convection currents of hot air (most effectively by impingement), thermal conduction from a hot oven surface, infrared rays, intense light, and/or, if the pan has a ferromagnetic component to its base, via induction. Generally speaking, however, microwave energy is ineffective to heat the food product through a metal pan surface, because the metal reflects the microwaves away, much like light from a mirror. Heating from below commonly is achieved with impinging hot air, as in the typical impingement oven.

Heating a pizza or other food product from above often is achieved by convection, as opposed to conduction. Convection heating may be effected by impingement of hot air or superheated steam, infrared rays, intense light or microwaves, to name several examples.

In the commercial pizza industry, for example in pizza restaurants and pizza delivery environments, it is generally considered desirable to achieve short baking times. This decreases customer wait time and allows more rapid oven and table turnaround. However, the speed of heat transfer in conventional baking environments (e.g. using convection, conduction, or infrared heating) is limited by conduction and the relatively slow migration of warmed water vapor from the top and bottom surfaces of the pizza into the center of the pizza. The heating process is further decelerated by the evaporation of moisture from an uncovered, baking pizza, in much the same way that perspiration cools a human body by evaporating from the skin.

In theory, the speed of heating can be greatly accelerated by simply raising oven temperature. However, if the temperature is too high, the crust of the pizza and the surface topping of the pizza may burn while the center of the pizza remains cold and insufficiently cooked, or even completely raw. The problem is heightened in that the outer rim of a pizza is particularly prone to burning and drying while generally suffering the most exposure to the sources of heat. As such, absent some other solution, baking typically has to occur at a reduced temperature, which ultimately slows the baking process.

Impingement baking has succeeded in shortening baking time, to a certain degree, by increasing the convection heat transfer coefficient without raising oven temperature. Even so, many consider impingement baking alone to be inadequate in the face of increasing consumer demand for hot, completely and evenly cooked food products in shorter and shorter time periods. In response to this pressure, microwave energy has also been used to reduce baking time. Although microwaves are able to penetrate more deeply into the center of food items that they heat, microwaves also can have the undesirable effect of supplying undesirably high heat levels to the edges of e.g. a pizza. This can result in drying and eventual burning of the crust, as well as undesirably tough textural properties, which are substantially the same problems faced when merely increasing oven temperature or applying microwaves alone.

Combining both conventional heating and microwave heating in a single oven can work to reduce overall baking time and provide other advantages. See, for example, U.S. Pat. No. 5,272,299 to Ovadia, which is incorporated herein by reference. Even with combined-heating environments like those in the Ovadia patent, however, the problems of drying, burning, and microwave-induced toughening at the outer edges of the food product, and/or rawness at the center, often still need to be addressed.

Further, the above-described advances in decreased baking time generally have not addressed the problem of baking different sized food products, e.g. large and small pizzas (which often require different amounts of heat and/or different baking times), in one oven at the same baking time and temperature. A small pizza may be burnt while a large pizza may remain uncooked if they are both baked under the same conditions of time and temperature. In the commercial environment, this can result in an excessive number of ovens or unacceptably high operational complexity.

A need has arisen in the art to address the above and other related problems. For example, there is a need for devices and/or methods that adequately reduce overall baking time while reducing operational complexity and providing even heating without burning, microwave-induced toughening, or rawness.

SUMMARY OF THE INVENTION

To address the disadvantages and problems of the prior art, pizza pan shielding systems and methods according to embodiments of the invention generally include one or more of the following: a pan, a bottom shield, a top shield, one or more types of ring shield, and/or a screen. According to one embodiment, the pan preferably incorporates a plurality of perforations formed in a desired pattern or patterns, and may also incorporate an extended rim portion for easy grasping by a gripper.

Bottom shield embodiments also preferably incorporate a plurality of perforations, also formed in one or more appropriate patterns. The bottom shield is designed to lie below and substantially surround, or at least support, the pan. The base of the bottom shield may lie flush to the base of the pan, or an air gap may be incorporated between the two.

Top shield embodiments according to the invention also preferably incorporate a plurality of perforations formed in one or more desired patterns. The top shield is designed to rest on top of or otherwise be supported over the pan, and it may include an upstanding portion or lip for easy gripping.

Ring shield embodiments according to the invention also preferably incorporate a plurality of perforations, formed in one or more desired patterns, as well as an open center section. As with the top shield, the ring shield is designed to rest on top of or otherwise be supported over the pan, and it may include an upstanding portion or lip for easy gripping.

Screen embodiments according to the invention are designed to rest within the bottom of the pan and operate to reduce contact between the food item and the pan. As such, the screen reduces conductive heat transfer while allowing convective heat transfer to occur substantially unimpeded.

Where shields and screens contact top or bottom surfaces of the pan may be attached a non-metallic layer that insulates from electrical currents and conduction heating. This is used to inhibit yet further conduction heat transfer and to substantially prevent the creation of potentially damaging, microwave-induced, electrical sparking known as "arcing."

With each selected element, e.g. pan, bottom shield, top shield, and/or ring shield(s), the material make-up of the element and/or the location, shape, size and density of the perforations and/or open center portions will determine the degree to which different types of baking energy, e.g. from different heat sources, will reach the food item within the pan. For instance, a pan or shield that is made of metal and has many perforations will tend to reflect microwave heating, but allow a certain degree of impingement heating, infrared heating, and/or intense light heating to occur via at least the perforations. Alternatively, a ceramic pan or shield that has few or no perforations generally will allow microwave energy to pass through to the food item while substantially insulating the food item from conventional heating. A metal ring shield generally will allow all types of heat energy to pass through its open center section, while preventing passage of at least microwave energy through its lip or edge.

Shielding systems according to embodiments of the invention operate to substantially equalize the heating of a whole food item, helping reduce baking time and reducing if not eliminating the problems of raw centers, and dried, burned, and/or tough edges. Further, shielding embodiments of the present invention substantially enable both a large food item and a small food item to be baked in the same oven under the same conditions of time and temperature, without substantial detriment to either food item.

Other features and advantages of the invention in its various embodiments will be apparent from the remainder of the specification.

BRIEF DESCRIPTION OF THE DRAWINGS

Embodiments of the invention are described with reference to the Figures, in which like reference numerals denote like elements throughout the figures, and in which:

FIG. 5 is a cross-sectional view of the FIG. 4 shield;

FIG. 6 is a cross-sectional view of a pan and a pan top shield in a stacked configuration;

FIG. 7 is a cross-sectional view of a pan, pan bottom shield, and pan top shield in a stacked configuration;

FIG. 8 is a plan view of a pan bottom shield according to an alternative embodiment of the invention;

FIG. 9 is a plan view of a pan bottom shield according to an alternative embodiment of the invention;

FIG. 12 is a cross-sectional view of the FIG. 11 pan;

FIG. 14 is a cross-sectional view of the FIG. 13 ring shield;

FIG. 20 is a cross-sectional view of a ring shield according to an alternative embodiment of the invention.

FIG. 21 is a cross-sectional view of a pan and ring shield in a stacked configuration, according to an embodiment of the invention.

FIG. 22 is a pictorial view depicting a ring shield and shielding regions and zones, according to an embodiment of the invention.

DETAILED DESCRIPTION OF PREFERRED EMBODIMENTS

According to a preferred embodiment, a cooking utensil in the form of a pan is designed for baking pizza-type food products. Also according to a preferred embodiment, shielding systems and methods are designed for shielding such pizza-type food products and/or their underlying pans during the baking process. Pans, shielding systems and methods according to the invention, however, are not limited to use with pizza-type products. They have wide application for use in cooking other foods, including pies, cookies, pastries, and numerous other food products. Additionally, shielding systems and methods according to the invention can be used in shielding other types of cooking utensils, not just pans, as well as food products alone without an underlying pan. Thus, while preferred embodiments of the invention will at times be described with respect to pizza-type products and related hardware, the invention is not limited to these embodiments.

Figure 1:
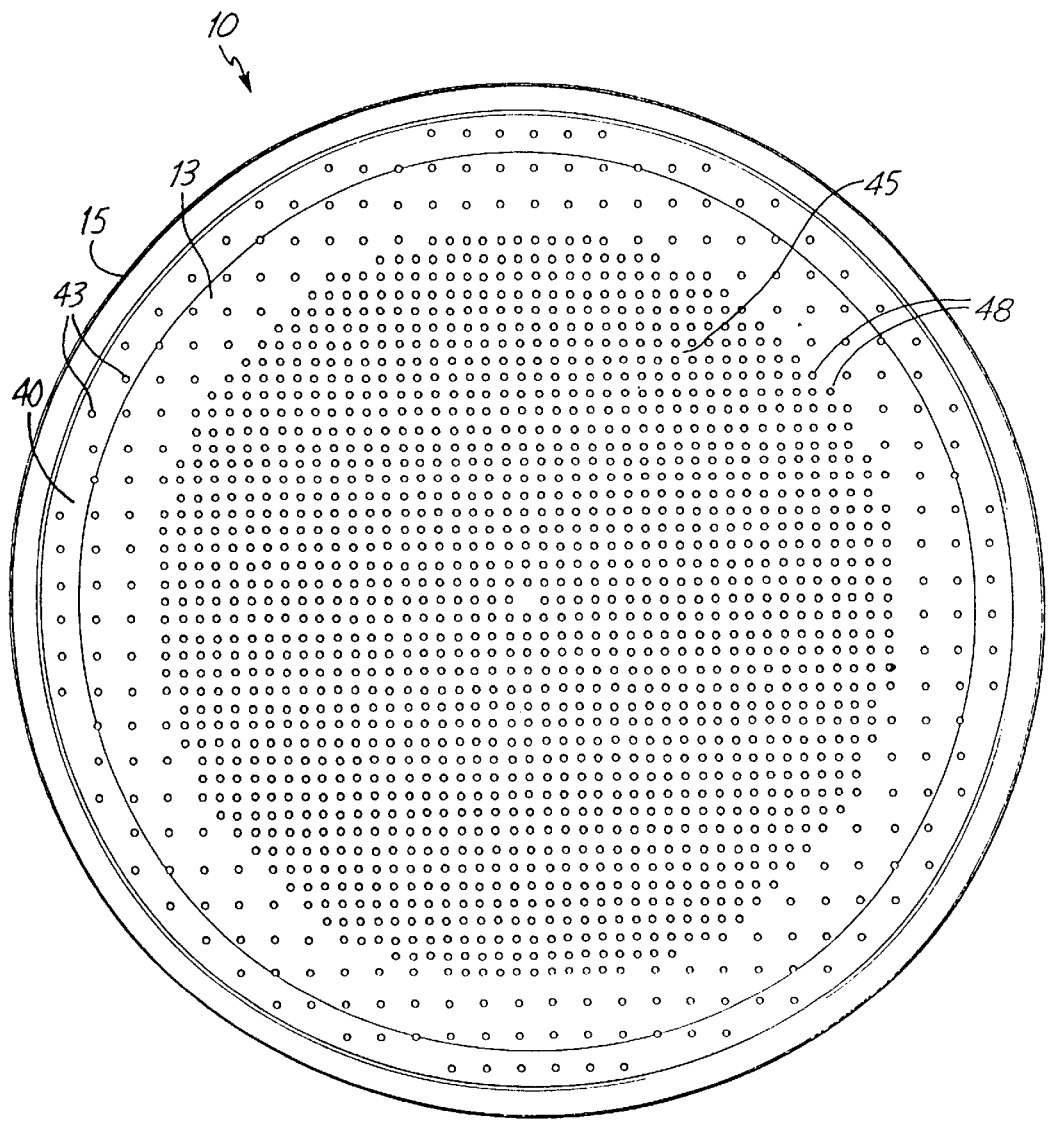
FIG. 1 is a plan view of a pizza pan for use with embodiments of the invention.

FIG. 1 illustrates a preferred embodiment of a pan for use with shielding systems according to the invention. Pan 10 includes outer rim 15 preferably disposed at a obtuse angle with respect to base 13 of pan 10. A wide variety of obtuse angles are possible, to produce desirable results with respect to a particular food product or baking situation, as will be apparent to those of ordinary skill.

Base 13 of pan 10 preferably includes a plurality of perforations 43, 48, disposed in two distinct regions 40, 45. Perforations 43 within outer region 40 are spaced farther apart than are perforations 48 of central region 45, as shown. Various other features and advantages of pan 10 are described in and/or will be apparent from commonly assigned U.S. Pat. No. 5,680,956, which is incorporated by reference herein.

With various types of baked pizza-type and other-type products, it is desirable to use a very intense heat environment to thoroughly cook the product in a relatively short amount of time. This has significant application, for example, in the chain pizza-restaurant setting, where it is desirable to minimize customer wait-time while still presenting product that is acceptably prepared and baked. For optimal presentation, many pizza-type products use a somewhat fragile dough that is quite susceptible to heat and therefore more likely to burn, excessively brown or otherwise overbake. It has become desirable, therefore, to limit the amount of heat applied to the top and/or bottom of the product, for example impingement heat, conductive heat through the pan, etc., without lowering oven temperatures and without excessively disturbing convective heat.

To this end, shielding systems and methods according to certain embodiments of the invention have been developed. The shielding systems can include a pan bottom shield, a pan top shield, and/or a ring shield in close proximity to pan 10, as will now be described. Of course, pans other than the above-described pan can be used with shielding systems and methods according to the invention, for example non-perforated pans or pans including different perforation patterns or other structure allowing pass-through of heated air. A wide variety of pans, of different shapes, sizes and purposes, are contemplated for use with shielding systems and methods according to the invention.

Figure 2:
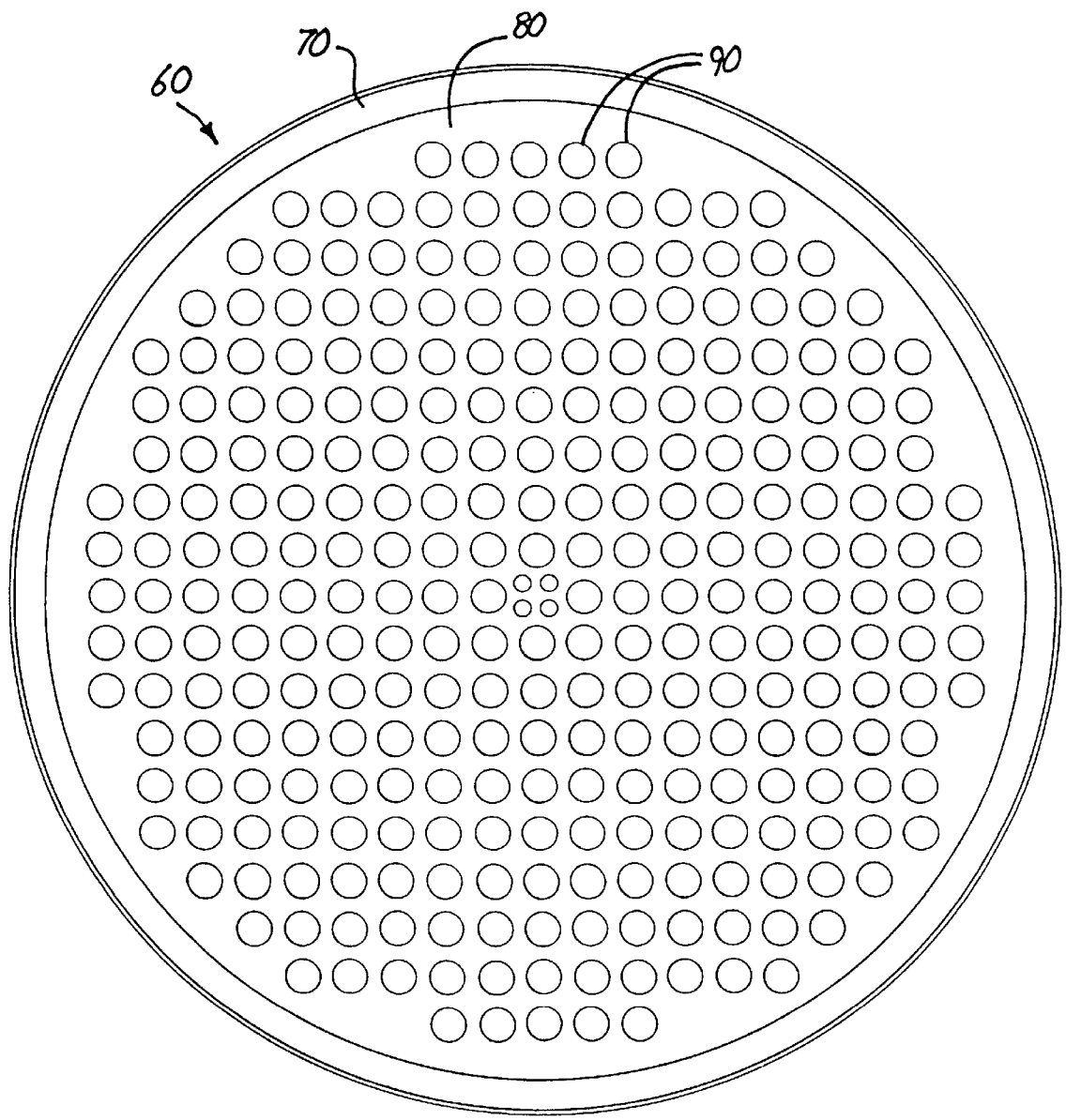
FIG. 2 is a plan view of a pan bottom shield according to an embodiment of the invention.
Figure 3:
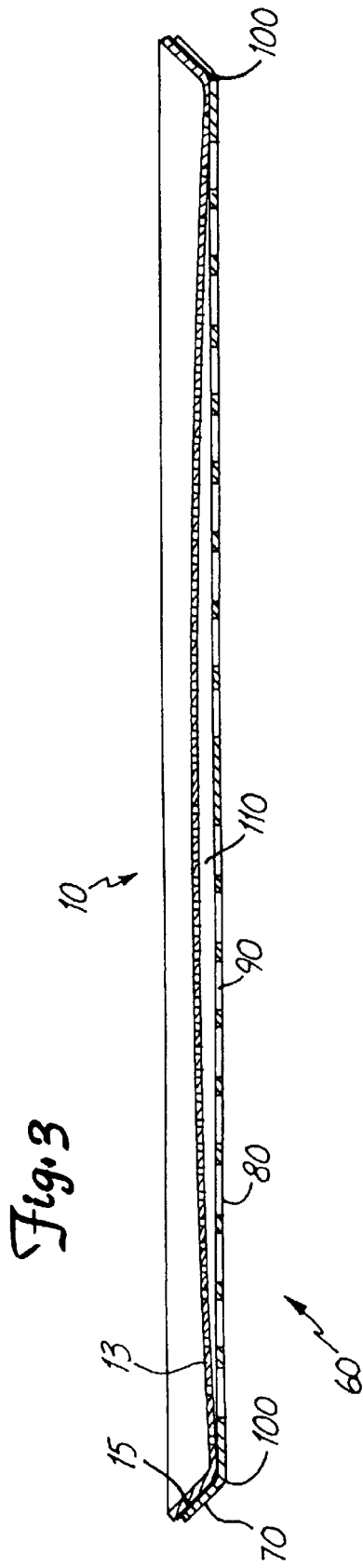
FIG. 3 is a cross-sectional view of a pizza pan and a pan bottom shield in a stacked configuration, according to an embodiment of the invention.

As shown in FIGS. 2–3, pan bottom shield 60 includes rim or sidewall outdented portion 70, angled upwardly from base 80 as shown. As with pan 10, rim 70 can assume a number of different angles with respect to base 80, as well as different heights, in accordance with the food product to be baked, the baking environment, etc. Base 80 of pan bottom shield 60 includes a plurality of perforations 90, allowing convective heat to pass directly through pan bottom shield 60. Perforations 90 can include a number of smaller perforations at a center portion of shield 60, as shown in e.g. FIG. 2.

Also as shown in FIG. 2, perforations 90 are disposed through base 80 in a series of substantially X and Y columns. This enhances tooling simplicity, in that some fraction of the perforations 90 can be punched at once, for example one-half of perforations 90, and then shield 60 rotated an appropriate amount, for example 90°, for punching again with the same tool. Thus, a repeating pattern is possible, and tooling and piecepart production complexity is reduced.

FIG. 3 shows pan 10 of FIG. 1 and shield 60 of FIG. 2 in a stacked, in-use configuration.

As shown, base 13 of pan 10 according to this embodiment includes a substantially raised or concave shape, such that base 13 is of greater elevation at a central portion of pan 10 than at rim 15. Pan bottom shield 60, on the other hand, is substantially flat, or at least has a shallower degree of concavity than base 13 of pan 10. Consequently, when pan 10 rests in pan bottom shield 60 in a baking configuration, the zone of contact 100 between pan 10 and shield 60 is confined to a relatively small area adjacent and/or at the outer edge of base 13. According to various embodiments, zone of contact 100 can include rim 15 of pan 10, resting on rim 70 of bottom shield 60, or can include a portion of pan base 13 in contact with a portion of bottom-shield base 80, or both. In other words, rim-to-rim contact, base-to-base contact, or both are contemplated according to the invention. The width of the zone of contact 100 circumferentially around pan 10 can of course be varied by changing the relative concavities of pan 10 and base 60, again in accordance with the type of food product and/or baking environment, for example.

The differing concavities of pan 10 and bottom shield 60 result in gap 110 being created between them. Because gap 110 separates base 13 of pan 10 from base 80 of bottom shield 60, conductive heat transfer from bottom shield 60 to pan 10 is significantly reduced. The air within gap 110 serves as an effective insulator, reducing the amount of heat delivered to the bottom of the product resting on pan 10 from the harsh baking environment. At the same time, however, convection heat is allowed through perforations 90 in bottom shield 60 and perforations 43, 48 in pan 10.

As shown in FIG. 3, pan 10 can be shielded by bottom shield 60 alone, without any shielding above pan 10 or above the food product supported by it. Alternatively, pan 10 can be used with a pan top shield, or both a pan top shield and pan bottom shield 60, as now will be described.

Figure 4:
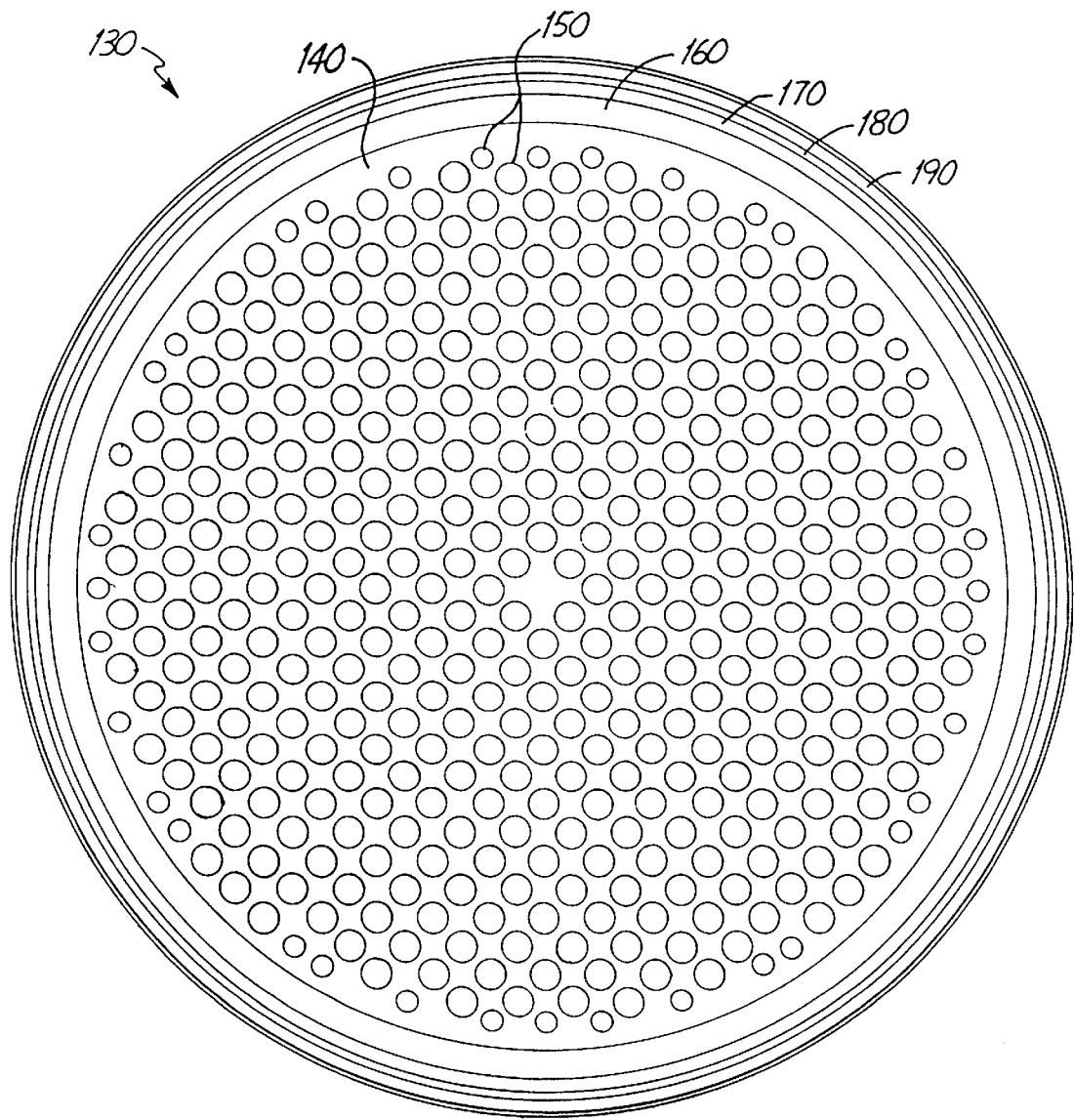
FIG. 4 is a plan view of a pan top shield according to an embodiment of the invention.
Figure 17:
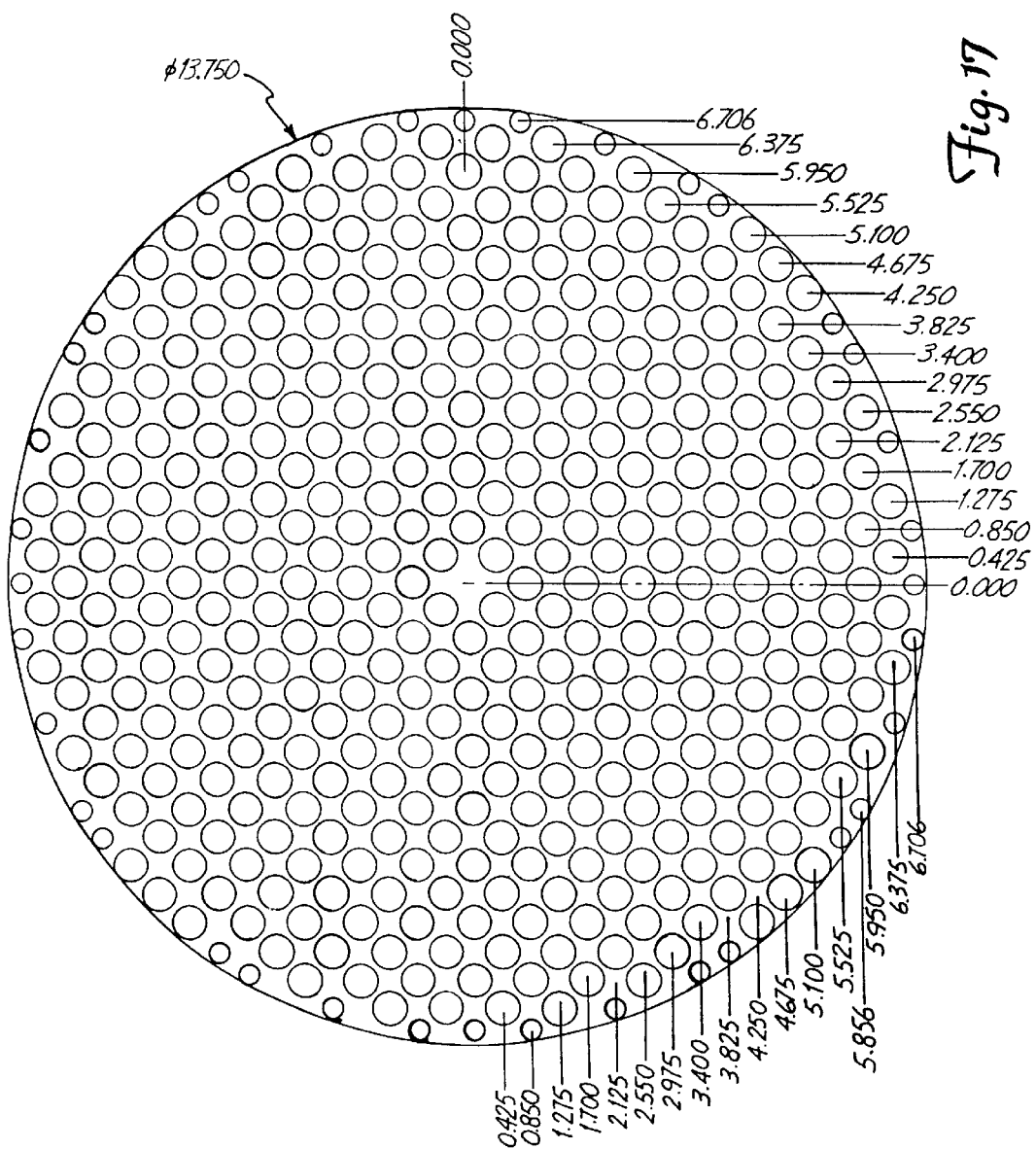
FIG. 17–19 are engineering diagrams of a top shield according to an embodiment of the invention.
Figure 18:
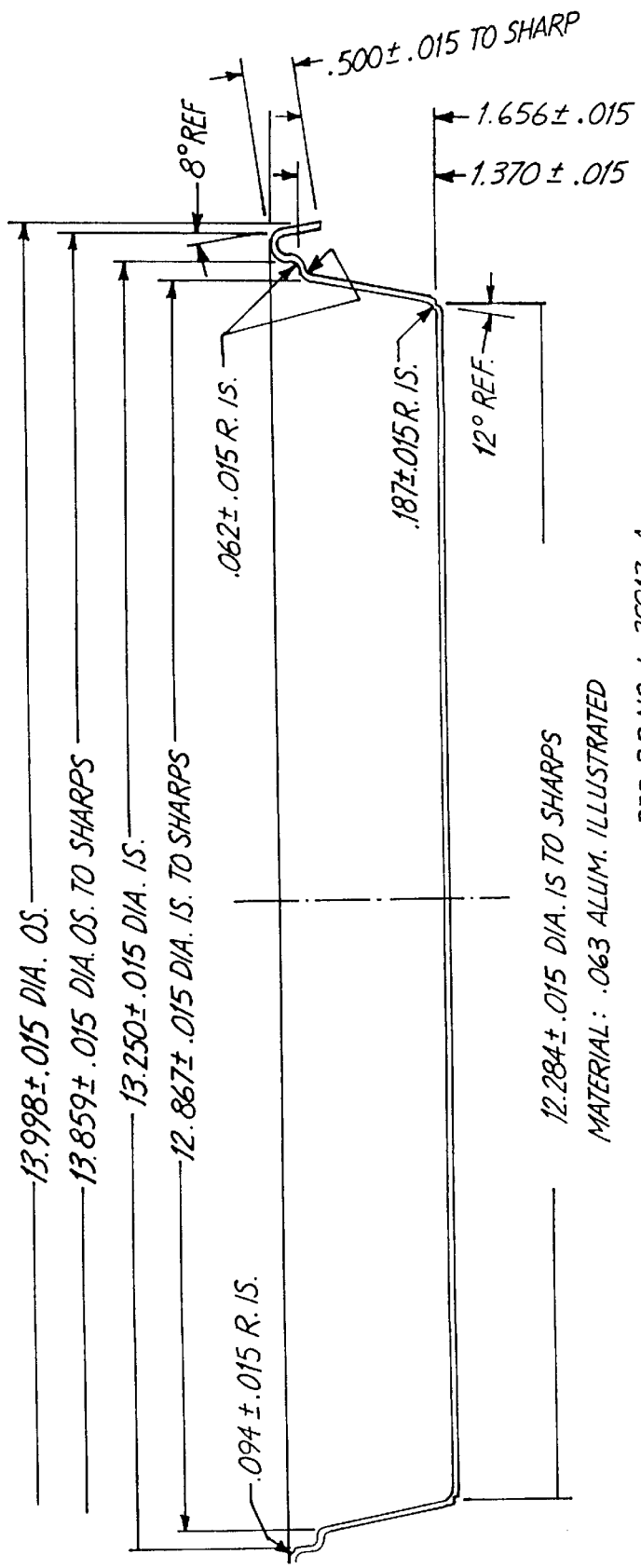
Figure 19:
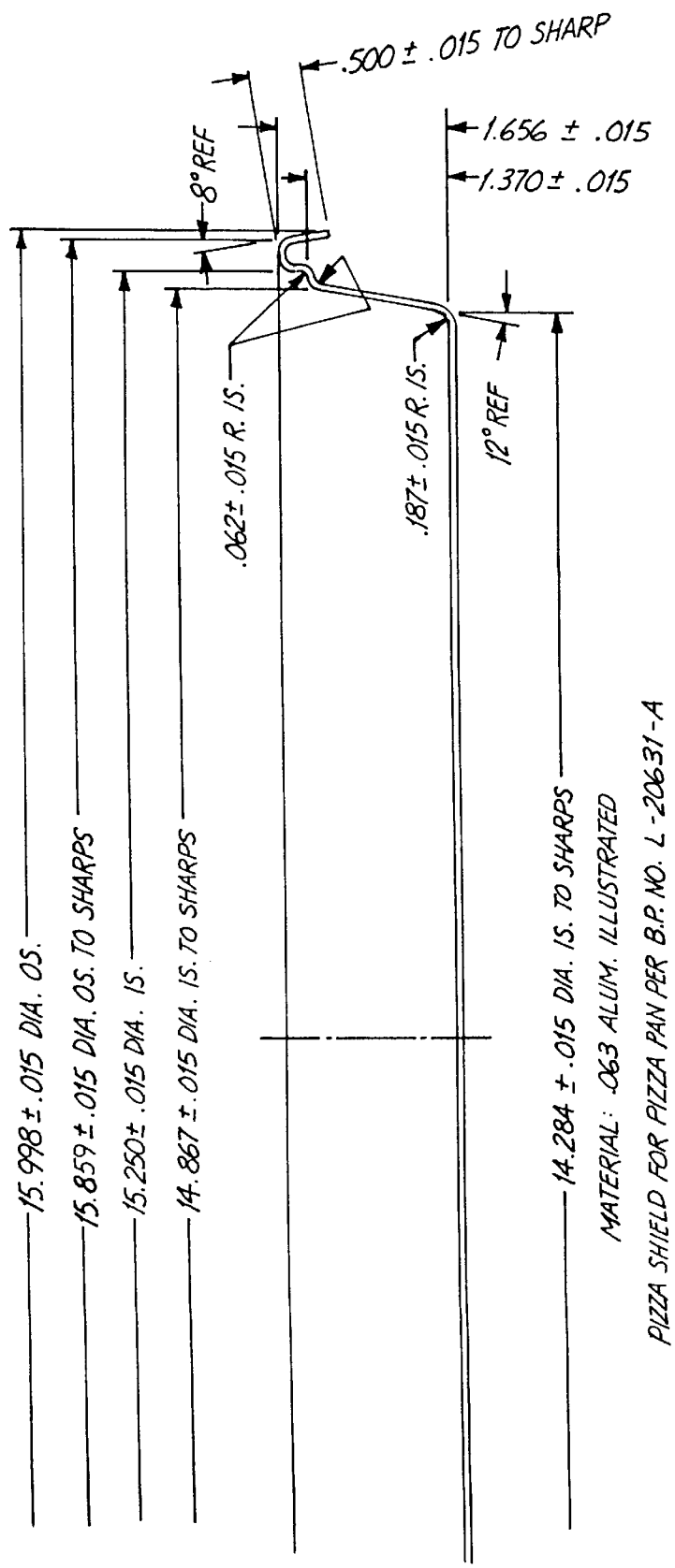

As shown in FIGS. 4–5, pan top shield 130 according to an embodiment of the invention includes top surface 140, having perforations 150 disposed therethrough for transmission of convective heat. As best shown in FIG. 5, tapered side edge 160 extends downwardly from top surface 140 at a desired angle, for example the angle shown in the engineering diagrams depicted in FIGS. 17–19. This tapered side edge 160 allows compact, substantially nested stacking of top shields 130. Side 160 includes outdented portion 170, the function of which will be described below. Side 160 also includes bottom portion 180 and upstanding portion 190, which is advantageously configured for easy access by a gripping tool, e.g. for easy removal from an oven. Of course, upstanding portion 190 can assume a variety of angular orientations according to the invention, for example vertical or 45° orientations.

FIG. 6 depicts top shield 130 in use on top of pan 10. As shown, the upper portion of rim 15 on pan 10 nests well in outdented portion 170 of side 160. Thus, outdented portion 170 guides pan top shield 130 to a desired position with respect to underlying pan 10.

According to various embodiments, top shield 130 can include perforations through side 160, for example in a manner similar to that described with respect to ring shield 350 and FIGS. 13–14, below. Additionally, a series of small indentations can be made in the upper surface of top shield 130 at outdented portion 170, akin to those that might be made with e.g. a ball peen hammer. Such small indentations can be four in number, for example, and will result in a corresponding series of bumps on the underside of outdented portion 170. These bumps serve to slightly elevate top shield 130 above rim 15 of pan 10 when the FIG. 6 configuration is used, creating an air gap. With perforations in side 160 and/or the indentations and bumps described above, air entering perforations 150 in top shield 130 can flow through the top of top shield 130 and then out sides 160 and/or through the air gap, potentially improving baking and/or heat-transfer characteristics.

Pan top shield 130 extends preferably, though not necessarily, all the way across the top of the food product resting in pan 10. Many baking environments in e.g. chain pizza restaurants subject the baked products to extreme temperatures, as mentioned above, with the goal of significantly reducing the baking time. Many pizza toppings, however, can become significantly overbaked because of their direct exposure to the harsh oven environment. Pan top shield 130 provides a much gentler bake, because it significantly limits the amount of heated air flowing to the product, without eliminating it entirely. Top pan shield 130 acts as a diffuser and creates an environment between it and the underlying food product in the form of a substantially stagnant, or at least a reduced-speed, and/or altered-turbulence, air barrier having limited/altered convection characteristics and/or less-efficient heat-transfer characteristics. It is believed that the temperature in the barrier, underneath shield 130 and above the product, may be lower or substantially lower than the temperature above top shield 130, directly in the baking environment. This protects the product from overbaking, and it is especially useful in dough-type products such as pizza.

The baking effect on the top surface of the food product in pan 10, however, is not affected solely by pan top shield 130. Driving a significant amount of heat from the bottom of pan 10 into the bottom of the food product can significantly affect e.g. coloring, texture and other characteristics on the top and sides of the food product. In other words, the effects seen on the top of the product are not driven solely by the top shield 130. Therefore, it is generally advantageous in some oven/product applications to use bottom shield 60 and top shield 130 together in a stacked configuration with pan 10, as shown in FIG. 7. Of course, as illustrated in FIGS. 3 and 6, pan 10 can also be used with only bottom shield 60 or with only top shield 130 as well.

According to another embodiment, it is also possible to stack two pans 10 together, such that the bottom pan 10 becomes a bottom shield for the top pan 10. Double-stacked pans, as well as pan 10 and bottom shield 60, can be removed from an oven together by a single gripping implement.

One potential disadvantage of using two pans 10 stacked together, however, is the convective interference that can occur due to the relative positioning of perforations 43, 48 between the two pans. In other words, in one rotational alignment between the top pan and the bottom pan, the perforations might line up and provide a more direct convective heat path. Upon slight rotation, however, the convective heat path characteristics are altered as the perforations pass out of alignment. Given the uniform quality desired from pizza to pizza in chain-type pizza restaurants, this randomness/uncertainty and corresponding effect on baking characteristics is generally undesirable. With the larger perforations present in the various bottom shield embodiments described herein, however, this randomness and uncertainty is substantially reduced, if not eliminated.

Figure 10:
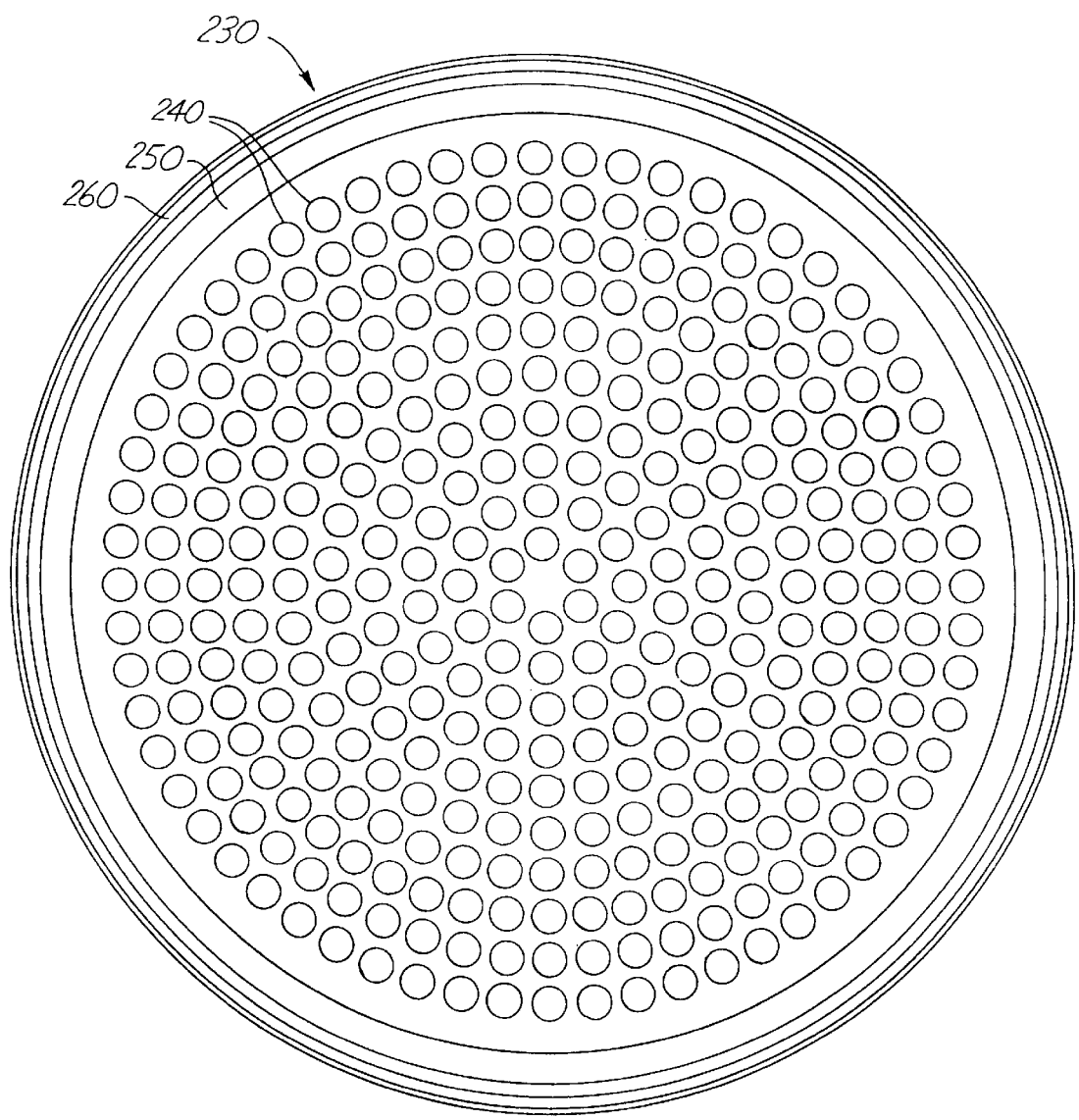
FIG. 10 is a plan view of a pan top shield according to an alternative embodiment of the invention.

Of course, a wide variety of shield diameters, rim angles, perforation diameters and densities, and perforation center-spacings are contemplated according to the invention for both bottom shield 60 and top shield 130. FIGS. 8–9, for example, illustrate alternate bottom shields 210, 220, with alternative perforation patterns as shown. FIG. 10 shows an alternative embodiment of top shield. Top shield 230 includes perforations 240 disposed circumferentially, i.e. in a series of concentric circles, instead of in X and Y columns. Edge 250 of shield 230 also differs somewhat from edge 160 of shield 130 in that edge 250 is substantially steeper, not having as steep of a taper as top shield 130. Edge 250 of shield 230 does include an upstanding edge portion 260, however, for easy gripping by a pan gripper or similar implement. As with upstanding portion 190 of top shield 130, and indeed as with all of the gripping portions described in the various shield and pan embodiments in this application, the angle of upstanding portion 260 can be altered to fit a particular gripper or other tool/situation. Additionally, the height of the top shield can be selected to produce a desired vertical spacing between the top of the food product and the shield. This would impact/alter product baking, with greater vertical space generally reducing the "bake level" that the food product is exposed to.

According to one embodiment, a bottom shield according to the invention includes half-inch perforations on $^{11}/_{16}$ths inch centers on a roughly $9^{5}/_{8}$ths diameter perforation region. Alternatively, half-inch perforations on ¾ inch centers are possible, although with $^{11}/_{16}$ths inch centers an entire extra row of perforations is possible within the same perforation region diameter. Of course, various perforation region diameters are also contemplated, for example 9⅝ inches as described above, 12 inches, etc. The diameter of the perforation region will depend on pan diameter, perforation size, baked product, and/or other factors. See FIGS. 17–19 for further non-limiting examples of possible perforation and other characteristics.

Figure 11:
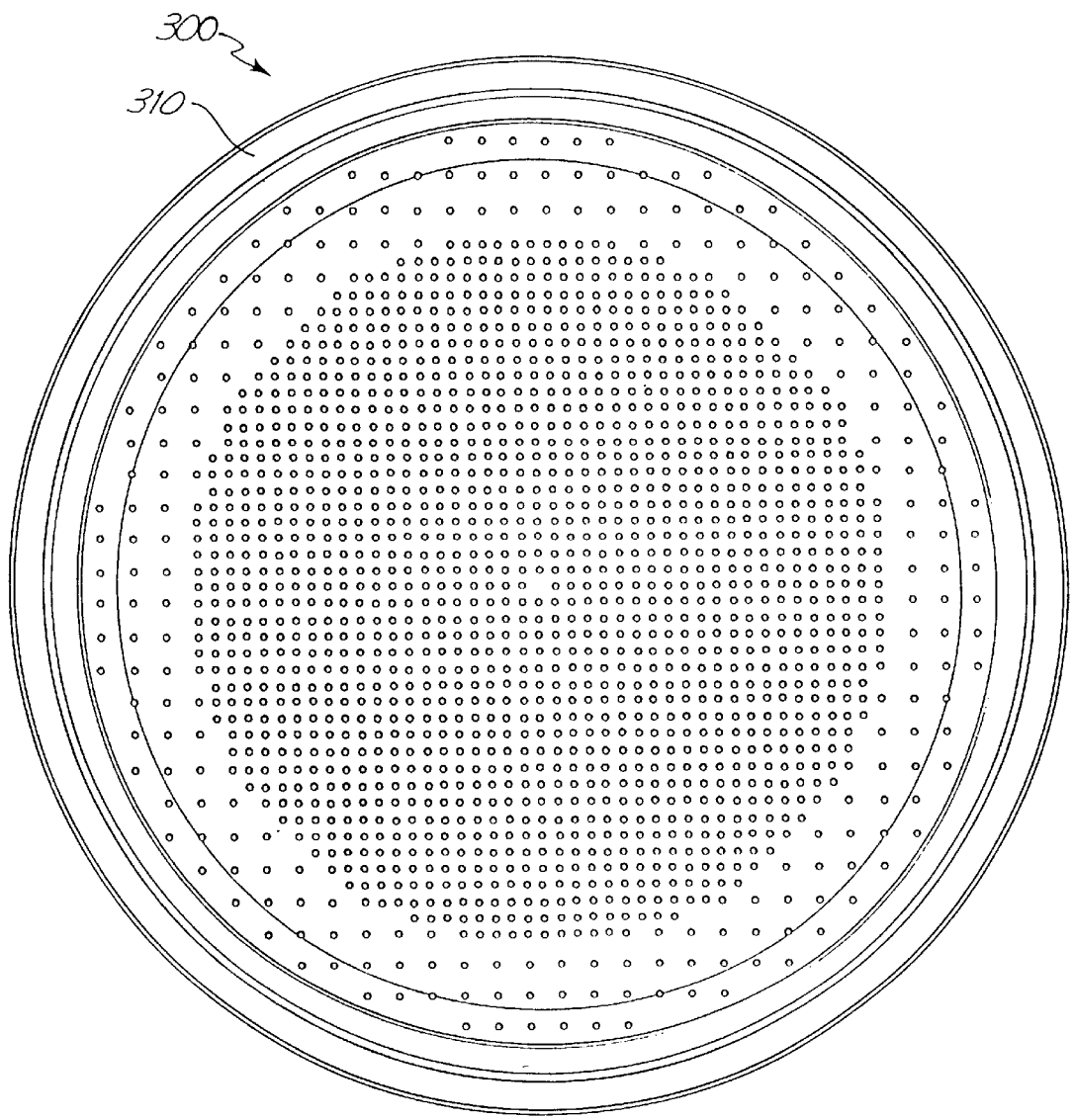
FIG. 11 is a plan view of a pan according to an alternative embodiment of the invention.

Turning to FIG. 11, an alternative embodiment of pan 10 is illustrated. Pan 300 is substantially similar to pan 10, but includes an extended rim portion 310 to allow easy grasping by a gripper or other implement. As best shown in FIG. 12, rim 310 includes ledge 315 and a narrowed portion 320, the purposes of which will now be described with reference to FIGS. 13–15.

Figure 13:
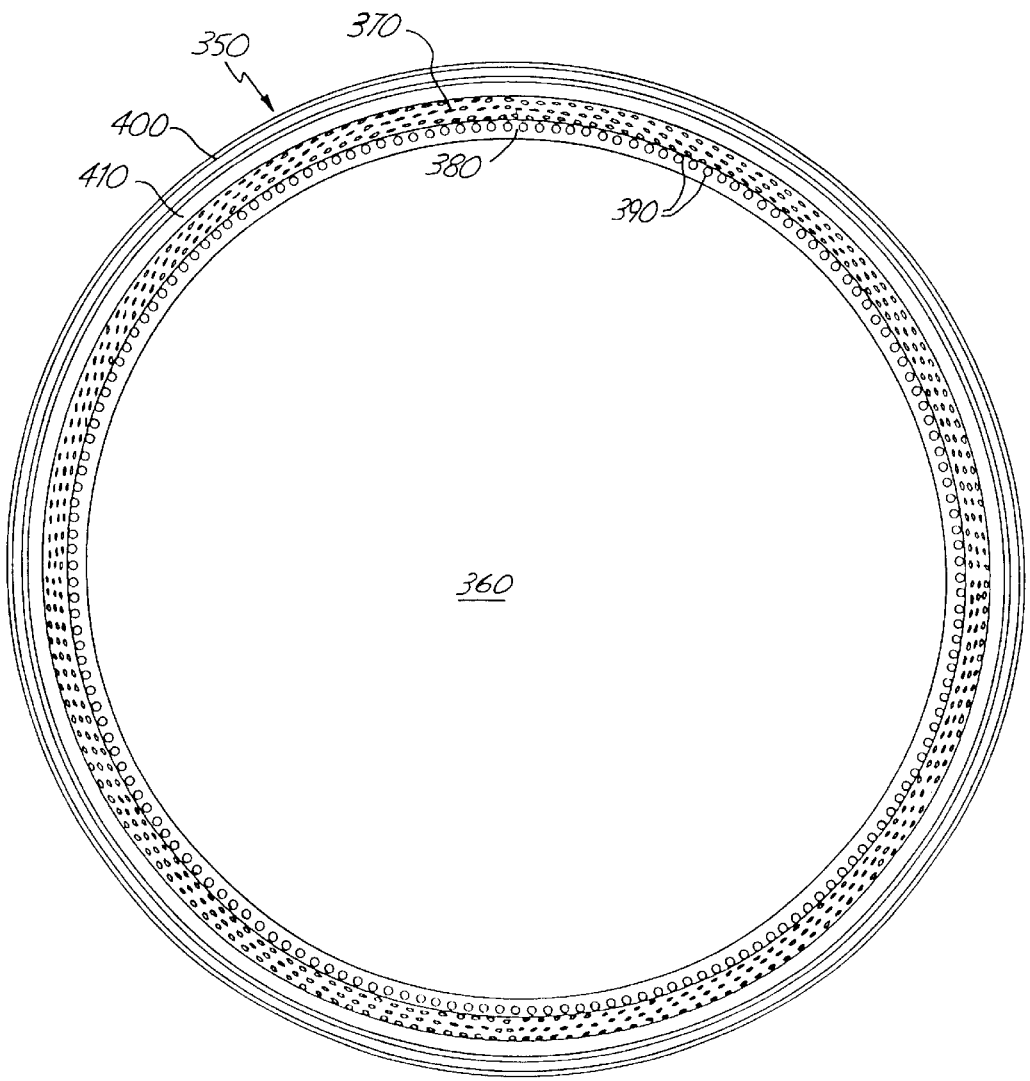
FIG. 13 is plan view of a ring shield according to an embodiment of the invention.
Figure 15:
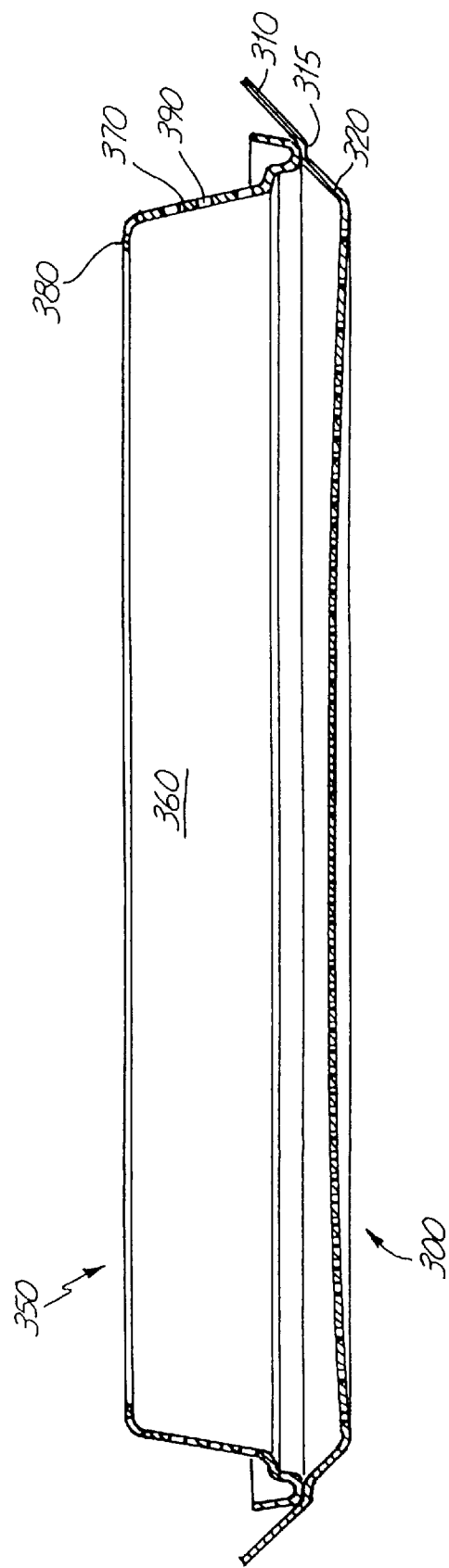
FIG. 15 is a cross-sectional view of a pan and ring shield in a stacked configuration, according to an embodiment of the invention.

FIGS. 13–15 describe another top-shield embodiment according to the invention. Ring shield 350 includes an open center section 360 surrounded by circumferentially extending wall 370. Wall 370, which includes a bent inner lip 380, includes a plurality of perforations 390 throughout, allowing passage of convection heat. Additionally, ring shield 350 includes upstanding portion 400, which permits easy grasping by a gripping tool or similar implement. Side 370 also includes outdented portion 410, the purpose of which will be described below.

As shown in FIG. 15, ring shield 350 can advantageously be used with pan 300, resting on ledge 315 created between narrowed portion 320 and the rest of rim 310. Ring shield 350 thus especially protects the outer edge of the food product resting on pan 300, for example, the crust of a pizza-type product. At the same time, extended portion 310 of the rim of pan 300 allows easy grasping and thus removal from an oven or other baking environment. In fact, any of the top-shield embodiments described in this application can be used with pan 300, e.g. resting on ledge 315, to provide easy, one-motion grasping and removal.

Ring shield 350 can also be used with pan 10 described with respect to FIG. 1. To this end, rim 15 of pan 10 can support ring shield 350 from underneath at outdented portion 410, shown in FIG. 14. Use with pan 300 is somewhat more advantageous, however, in that extended rim 310 allows pan 300 to be more readily grasped for removal from the oven. Stacking ring shield 350 directly on pan 10, on the other hand, provides a more difficult grasp for pan 10 and likely may require gripping of upwardly turned portion 400 of ring shield 350, followed by separate gripping of pan 10. Thus, whereas pan 300 with ring shield 350 allows lifting out of the oven with substantially a single motion, the combination of pan 10 and ring shield 350 requires two motions, one for lifting ring shield 350 out of the oven and then one for lifting pan 10 out of the oven.

Figure 16:
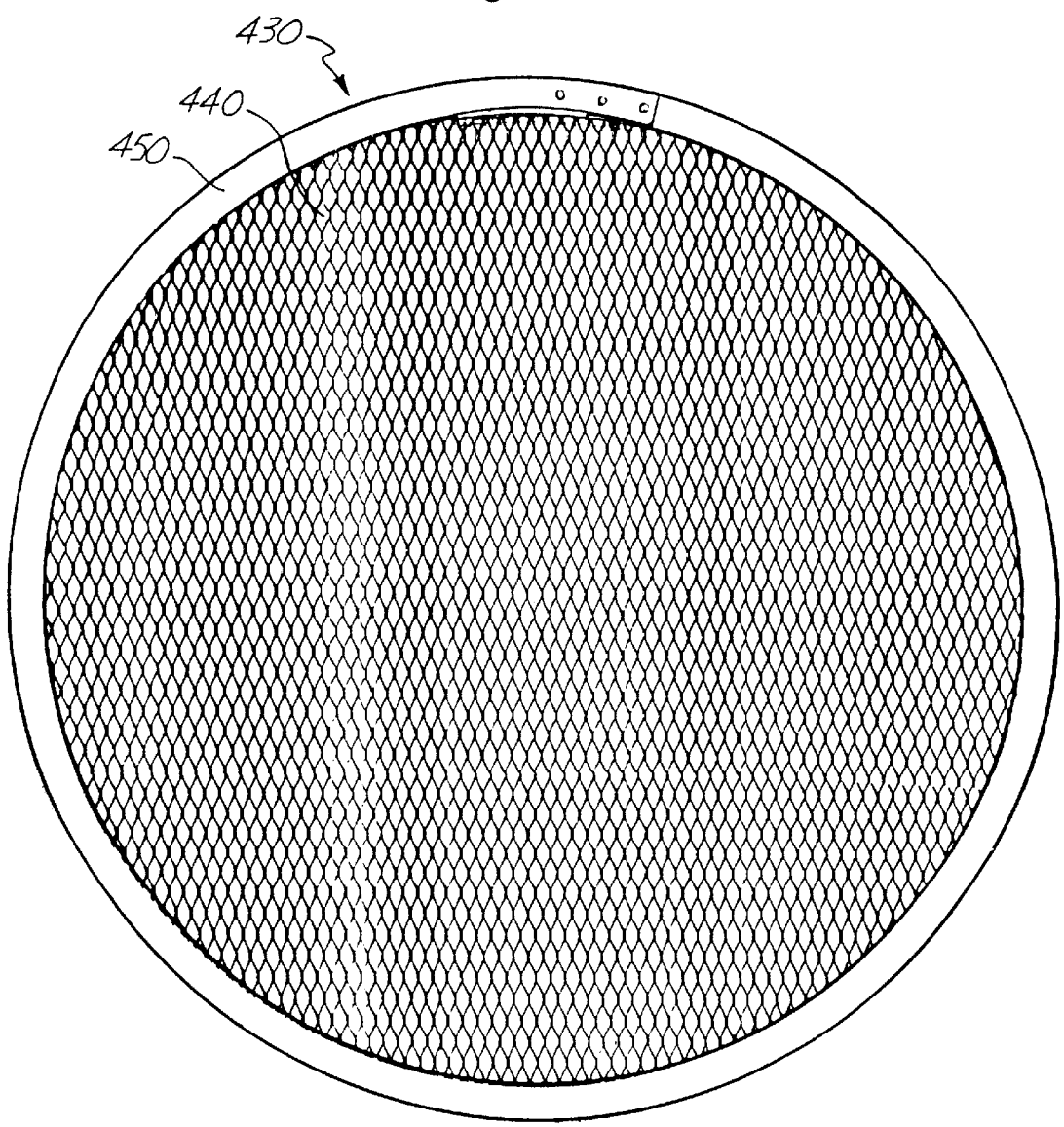
FIG. 16 is a plan view of a screen according to an embodiment of the invention.

Turning to FIG. 16, screen 430 can be used with pan 10 or pan 300 of the previously described embodiments. Screen 430 includes mesh portion 440, which preferably is substantially flexible and yet not loose around outer edge 450. Screen 430 can be advantageously set in the bottom of either pan 10 or pan 300, minimizing or substantially eliminating contact between the upper surface of the pan and the food product being baked and supported thereon. Thus, screen 430 reduces conductive heat transfer while allowing convective heat transfer to occur substantially unimpeded. Screen 430 can be somewhat more cumbersome to use operationally with certain types of food products, such as pizza products, because it can be difficult to remove from the bottom of the pizza when the baking process is complete. Alternatively, it is envisioned that screen 430 also could be placed above the food product, supported by e.g. the pan or another structure.

Turning to FIGS. 20–22, an alternative embodiment of ring shield 350 is illustrated. Ring shield 550 preferably includes upper layer 552 and lower layer 554. Upper layer 552 is preferably formed of a metallic or metallized material, for example aluminum, e.g. solid aluminum or aluminum foil while lower layer 554 is preferably an insulating material, for example ceramic or high-temperature, resin-filled or glass-filled plastic. Upper layer 552 preferably lies flush against lower layer 554, but an air gap between upper layer 552 and lower layer 554 may be optionally incorporated. Lower layer 554 can reduce detrimental infrared radiation directed to the pizza from the shield itself.

Ring shield 550 also includes open center section 560, preferably surrounded by circumferentially extending wall 570. Wall 570 adjoins inner lip 580 which includes a plurality of perforations 590 preferably extending through both upper layer 552 and lower layer 554. Perforations 590 may also extend through wall 0570, if desired. Perforated lip 580 is of a width dimension suitable to provide desired baking results, for example about 0.25 to about 0.5 inches for a 12-inch diameter shield, more preferably about 0.5 to about 3 inches. A preferred dimension according to one embodiment is about 0.5 inches; in other words, open center section is about 11 inches in diameter in the plane of lip 580. Perforations 590 may be in various sizes and patterns, although a uniform perforation density, like that shown in FIG. 22, generally is preferred. Additionally, ring shield 550 optionally includes upstanding portion 600, which permits easy grasping by a gripping tool or similar implement. Wall 570 also optionally includes outdented portion 610 which can also be called a step, for resting on the rim of e.g. a pizza pan or other implement.

As shown in FIG. 21, ring shield 550 can be used with pan 300 (see FIG. 12), resting on ledge 315 created between narrowed portion 320 and the rest of rim 310. Ring shield 550 also can be used with pan 10, described with respect to FIG. 1. To this end, rim 15 of pan 10 can support ring shield 550 from underneath at outdented portion 610. In both instances, a portion of lower layer 554 preferably is in contact with the underlying pan, preventing direct contact between upper layer 552 and the pan. If pan 10 or pan 300 is formed of a metallic or metallized material, such metal-to-metal contact across a narrow gap could cause arcing in a microwave baking setting. Providing shield 550 with ceramic lower layer 554, on the other hand, substantially eliminates or reduces the likelihood of arcing. It should be noted, however, that lower ceramic layer 554 is optional; if desired, shield 550 can be formed of one layer. It should also be noted that a spacer formed of rubber or ceramic material can be used to hold shield 550 above the edge of the metal pan, to prevent direct contact. All exposed edges can be rounded, as well, to further reduce the possibility of arcing.

As indicated above, there are a number of different types of heat sources that can provide various forms of baking energy. Typical forms include impinging hot-air jets and electromagnetic radiation, such as microwaves, infrared rays, intense light in the visible spectrum, as well as combinations of the above. Ring shields according to the invention include one or more regions that substantially block, or at least impede, baking energy from reaching an underlying food product.

FIG. 22 illustrates baking-energy shielding zones of e.g. ring shields 350, 550. For simplicity, FIG. 22 will be described with respect to ring shield 550, but it should be understood that the description applies equally to other ring-shield embodiments, like shield 350 depicted in e.g. FIGS. 13–14. Inner lip 580 of ring shield 550 defines a shielding region, indicated at A, and an open center section 560, i.e. a non-shielding or transmissive region, indicated at B. The portion of the food item, in this instance a pizza 650, in illustrated zone A is shielded from receiving direct baking energy from some heat sources, as will be described, while that portion of pizza 650 or other food item in zone B is unprotected. The material make-up and configuration of ring shield 550 will primarily determine which types of baking energy reach the food item and which types do not.

For instance, if ring shield 350 is composed solely of a non-metallic material, for example ceramic, and has no perforations, the food item in zone A is protected from impingement heating. If the ring shield 350 has only a few perforations 390, the food item in zone A is partially protected from impingement heating. However, in both instances, the food item is provided with little or no protection from microwave heating since microwaves tend to pass through ceramic objects without significant attenuation.

According to another embodiment of the invention, ring shield 350 that is comprised solely of a metallic material with perforations of less than about 3 mm in diameter. It is known to those versed in the art that microwaves commonly used to heat food, of frequency 2450 MHz, for example, cannot and do not pass through perforations of such small diameter. Thus, shielding region A substantially blocks microwave energy from passing through to zone A of the food item. However, if the perforations are numerous enough, other heating modes such as impinging jets or air, infrared rays, and intense light will pass through the holes to some extent. Thus, region A, which substantially blocks one form of baking energy, allows transmission of another form of baking energy via its perforations.

In the instance of ring shield 550, with upper layer 552 of a metallic material and lower layer 554 of a ceramic material, upper layer 552 acts to reflect microwave energy and transmit other forms of baking energy, e.g. infrared heat, intense light and/or impinging jets of hot air. If perforations 590 are few or of an extremely small diameter, on the other hand, one or more of these types of baking energies may be substantially blocked. In either case, providing a ceramic or other non-metallic material as lower layer 554 acts to inhibit conduction heating from upper layer 552.

Ring shields 350, 550 also operate to help retain moisture in those food item areas located in zone A, while moisture is allowed to escape from the food item in through non-shielding region B. In this manner, ring shields 350, 550 protect the outer rim of the food item, e.g. a pizza crust. As described earlier, this is an area that tends to dry, become tough from microwaves, and burn more easily, at least in part because the dough is unprotected by toppings. On the other hand, ring shields 350, 550 tend to encourage drying (which generally is an integral part of the baking process) in the center of the food, which is an area that tends to bake more slowly.

Ring shields according to the invention can be made of a wide variety of diameters and shapes. Shapes generally corresponding to the shape of the underlying food product generally are preferred. Because the diameters of both the shield itself and the transmissive, central region it defines can be varied to suit a particular product or baking environment, use of ring shields 350, 550 is helpful in baking food items of varying sizes. According to the invention, larger and smaller food items can be cooked substantially simultaneously, under identical cooking conditions of time and temperature, without adverse effect. Further, in addition to varying the dimensions, ring shields according to the invention can be omitted for some food items and applied to other food items as they pass through e.g. a conveyor oven. For example, a shield can be appropriately applied to a small food item requiring less heat and appropriately omitted from a large food item requiring more heat.

Experimental Results

The attached Appendix presents results from baking tests performed on food item, specifically pizzas. Tables 1 and 2 provide the results of baking tests performed without a ring shield, while Table 3 provides the results of baking tests performed with ring shield 550.

With respect to Tables 1 and 2, experiments were performed in which intense-light baking, according to a FLASHBAKE process, occurred in a batch oven, and subsequent impingement baking occurred in a conveyor oven. The experiments used medium cheese pan pizzas and medium SUPREME pan pizzas, such as those produced at various Pizza Hut restaurants, that were twelve inches in diameter. For experimental simplicity, intense-light baking was performed first in one oven, after which the pizza was manually transferred to an impingement baking oven. Embodiments of the invention, however, contemplate a single oven, e.g. a conveyor oven, providing both forms of baking energy or other forms. Seven tests were performed on the cheese pizzas (Table 1) while six tests were performed on the SUPREME pizzas (Table 2), as indicated by the leftmost "Sequence" column, here called column 1, in these two tables.

The independent variables in the experiments included: (1) the number of minutes in a FLASHBAKE oven, designated "FB time" in column 2; (2) the number of minutes in an impingement oven, designated "MM time" in column 3; and (3) the temperature of the impingement oven, designated "MM Tem" in column 4.

The dependent variables in the experiments included: (1) top crust color, designated "tcrst" in column 5 and having a scale of 0–10 with an acceptable range of 4–7 indicating a nicely browned color; (2) bottom or base crust color, designated "bcrst" in column 6 and having a scale of 0–10 with an acceptable range of 4–7 indicating a nicely browned color; (3) the top cheese color, designated "chs" in column 7 and having a scale of 0–10 with an acceptable range of 3–6 indicating a nicely browned color; (4) the topping color, designated "tpng" in column 8 and having a scale of 0–10 with an acceptable range of 3–6 indicating nicely browned or cooked toppings (in the case of the cheese pizza, "chs" and "tpng" would be the same); (5) dough rawness, designated "raw" in column 9 and having a scale of 0–8 with a required rating of 0 indicating no rawness, i.e. a completely baked pizza; and (6) the internal average temperature of the pizza as determined by eight temperature readings (T-1 through T-8, columns 11–18), with a preferred range of 165 to 180° F. The average temperature is indicated in column 18, designated "$T_{avg}$."

The results of the experiments indicate that in attempts to achieve a desired dough rawness of 0, desired crust values of approximately 7, as well as desired topping and cheese values of approximately 6, the overall average temperature had to be quite high and, ultimately, always resulted in a burned crust.

Figure 23:
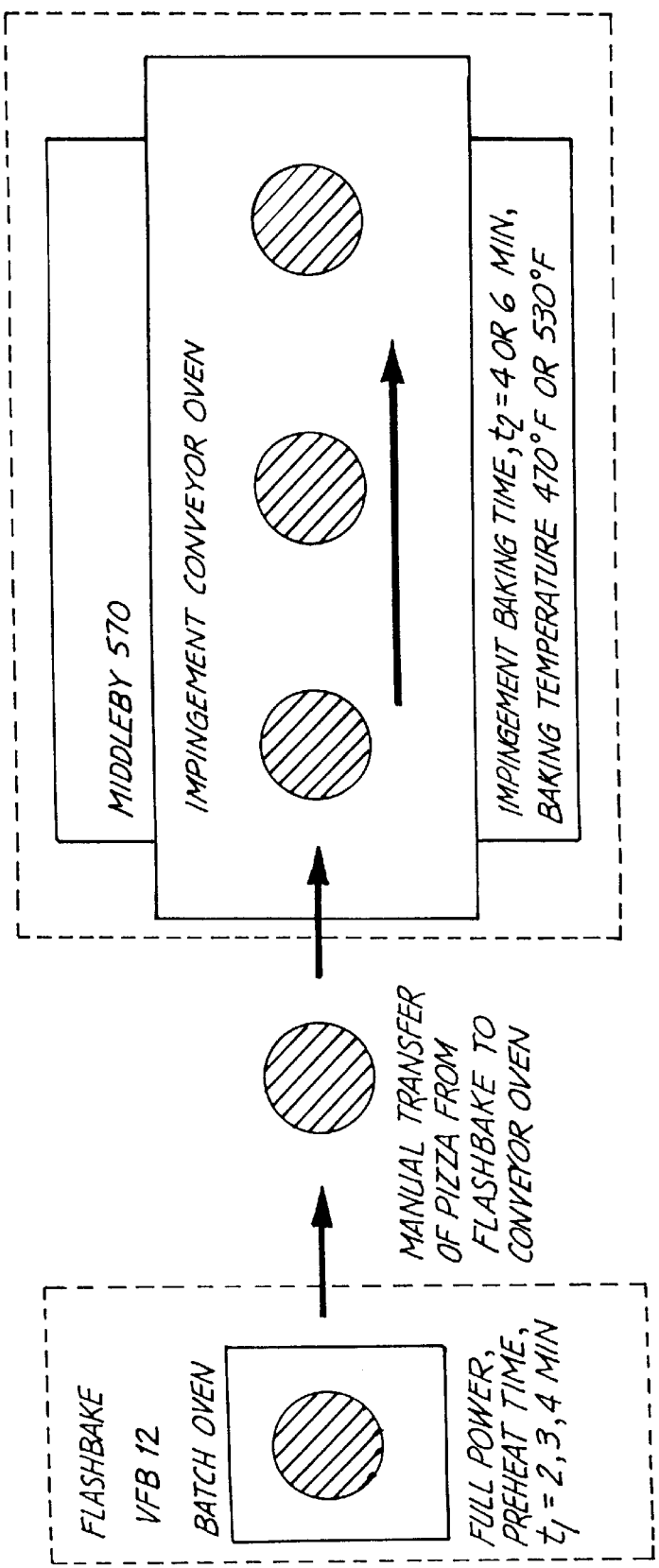
FIG. 23 is a plan, schematic view showing a two-oven baking process according to an embodiment of the invention.

With respect to Table 3, experiments were performed in which intense-light baking, according to a FLASHBAKE process, occurred in a batch oven, and subsequent impingement baking occurred in a conveyor oven. Note FIG. 23. In an operational environment, it is more likely that one oven would be used, combining impingement and FLASHBAKE baking. The experiments used medium cheese pan pizzas and medium SUPREME pan pizzas, such as those produced at various Pizza Hut restaurants, that were twelve inches in diameter. For experimental simplicity, intense-light baking was performed first in one oven, after which the pizza was manually transferred to an impingement baking oven. Embodiments of the invention, however, contemplate a single oven, e.g. a conveyor oven, providing both forms of baking energy or other forms. Nine testswere performed, as indicated by column 1 (the leftmost column).

The independent variables in the test included: (1) the hole diameter in an aluminum ring shield similar to that depicted at 550 in FIGS. 20–22, varying from 6 inches to 12 inches ( 12 inches indicating a pizza baked with no shield at all), designated "hole" in column 2; (2) the number of minutes in the FLASHBAKE oven, designated "FB time" in column 3; (3) the number of minutes in an impingement oven, designated "MM time" in column 4; and (4) the temperature of the impingement oven, designated "MM Tem" in column 5.

The dependent variables in the experiments included: (1) top crust color, designated "tcrst" in column 5 and having a scale of 0–10 with an acceptable range of 4–7 indicating a nicely browned color; (2) bottom or base crust color, designated "bcrst" in column 6 and having a scale of 0–10 with an acceptable range of 4–7 indicating a nicely browned color; (3) the top cheese color, designated "chs" in column 7 and having a scale of 0–10 with an acceptable range of 3–6 indicating a nicely browned color; (4) the topping color, designated "tpng" in column 8 and having a scale of 0–10 with an acceptable range of 3–6 indicating nicely browned or cooked toppings (in the case of the cheese pizza, "chs" and "tpng" would be the same); (5) dough rawness, designated "raw" in column 9 and having a scale of 0–8 with a required rating of 0 indicating no rawness, i.e. a completely baked pizza; and (6) the internal average temperature of the pizza as determined by eight temperature readings (T-1 through T-8, columns 11–18), with a preferred range of 165 to 180° F. The average temperature is indicated in column 19, designated "$T_{avg}$."

The results of the test, as indicated in Table 3, showed a significant advantage in using a shielding system according to the invention. For example, with a hole diameter of about 11 inches, (i.e. with a diameter of region B in FIG. 22 of about 11 inches and a total remaining width of region(s) A of about 1 inch (about 0.5×2=about 1 inch), about 4 minutes of FLASHBAKE time, and about 4 minutes of impingement-oven time at about 530° F., optimal or near-optimal dependent variables were achieved. From this particular experiment for these particular pizza types, it was determined that holes smaller than about eleven inches blocked too much heat from the pizza and prevented the top crust from browning. With appropriate shielding according to the invention, then, optimal baking and browning can occur at reasonable oven temperatures and without burning of the crust.

The same shielding properties described above with respect to ring shields 350, 550, i.e. the ability to prevent or allow certain types of baking energy to reach a food item and the ability to help retain moisture, apply equally to the other various embodiments described herein, including bottom shield 60 and top shield 130. Specifically, in the case of certain food items, such as pizza baked by microwave, it is often desirable to direct more intense heating at the top center of the pizza and to prevent e.g. microwave energy from reaching the bottom of the pizza. This can be achieved by using metal pan 10 or 300 and/or metal bottom shield 60 (both of which are generally able to shield the pizza from microwaves, depending on perforation diameter), optionally in combination with ring shield 350 or 550. Further, a ceramic layer, as described with reference to ring shield 550, may also be added to either side of bottom shield 60 or top shield 130 if appropriate to the baking situation.

While the invention has been described with reference to specific embodiments, the description is illustrative and is not to be construed as necessarily limiting the scope of the invention. For example, as mentioned throughout the specification, other types of food products advantageously can be cooked using the pans and shielding systems according to the invention, not just pizza-type products. The disclosed embodiments according to the invention also can be used in a wide variety of ovens, formed of a wide variety of materials, for example all ceramic materials, resin-filled or glass-filled plastics, or thermostatic resins, and can be of a wide range of sizes. Additionally, the disclosed embodiments have been described as being circular in shape but the principles described above apply to numerous other shapes, such as square, rectangular, triangular and a host of other shapes. Further, a shield may incorporate an open center section that is a shape distinct from the shield itself and/or may include a plurality of open center sections. The size, shape, number and density (number of holes per unit area) of perforations need not be spread uniformly across an entire shield. For example, a large number of large holes might be positioned near the center of the pizza, while fewer and smaller holes could be positioned nearer the outer edge of the pizza. In some cases, an outer rim with no holes will be effective in providing the desired shielding effect.

Although the term "baking energy" has been chosen to simplify the instant disclosure, the term should be interpreted to apply equally well to other types of heating and/or cooking, not just "baking" in a strict sense.

Further, various features of the different embodiments can be combined to suit a particular application. For example, top shield 130 as described herein can include circumferential perforation rings, instead of X and Y columns. The perforation regions on each of the shields may occur in varying densities (more or less perforations per region). As an additional example, tapered side 370 of ring shield 350 (or the side of ring shield 550) can be disposed at various angles, as can the sides of any of the top-shield and other embodiments described herein. Various other modifications will be apparent to those of ordinary skill without departing from the sphere and the scope of the invention.

APPENDIX

TABLE 1

| Sequ-ence | FB time (min) | MM tim (min) | MM Tem (° F.) | Medium Pan Cheese | | | | | Medium Pan Cheese | | | | | | | | |
|---|---|---|---|---|---|---|---|---|---|---|---|---|---|---|---|---|---|
| | | | | tcrst | bcrst | chs | tpng | raw | T-1 | T-2 | T-3 | T-4 | T-5 | T-6 | T-7 | T-8 | Tav |
| 1 | 1.00 | 4.00 | 470.0 | 6 | 5 | 5 | 5 | 7 | 123 | 145 | 142 | 144 | 140 | 154 | 133 | 150 | 141 |
| 2 | 1.00 | 6.00 | 470.0 | 8 | 7 | 8 | 8 | 0 | 177 | 179 | 188 | 192 | 180 | 191 | 185 | 184 | 185 |
| 3 | 1.00 | 5.00 | 500.0 | 8.5 | 7.5 | 7 | 7 | 1 | 163 | 168 | 171 | 176 | 166 | 180 | 180 | 173 | 172 |
| 4 | 1.00 | 4.00 | 530.0 | 8 | 7 | 7 | 7 | 3 | 149 | 151 | 155 | 162 | 151 | 153 | 154 | 157 | 154 |
| 5 | 1.00 | 6.00 | 530.0 | 10 | 9 | 10 | 10 | 0 | 193 | 188 | 192 | 187 | 194 | 183 | 189 | 200 | 191 |
| 6 | 2.00 | 4.00 | 470.0 | 7.5 | 5 | 6 | 6 | 0 | 181 | 153 | 153 | 174 | 177 | 177 | 163 | 175 | 169 |
| 7 | 2.00 | 5.00 | 500.0 | 9 | 8 | 8 | 8 | 0 | 178 | 181 | 184 | 184 | 188 | 183 | 184 | 191 | 184 |

TABLE 2

| Sequ-ence | FB time (min) | MM tim (min) | MM Tem (° F.) | Medium Pan Supreme | | | | | Medium Pan Supreme | | | | | | | | |
|---|---|---|---|---|---|---|---|---|---|---|---|---|---|---|---|---|---|
| | | | | tcrst | bcrst | chs | tpng | raw | T-1 | T-2 | T-3 | T-4 | T-5 | T-6 | T-7 | T-8 | Tavg |
| 1 | 1.00 | 4.00 | 470.0 | 5 | 4 | 3 | 3 | 8 | 113 | 158 | 114 | 122 | 127 | 144 | 132 | 111 | 128 |
| 2 | 1.00 | 6.00 | 470.0 | 7.5 | 6 | 5 | 5 | 1 | 166 | 162 | 169 | 166 | 165 | 163 | 170 | 165 | 166 |
| 3 | 1.00 | 5.00 | 500.0 | 7.5 | 7 | 5 | 5 | 5 | 150 | 159 | 149 | 147 | 143 | 147 | 152 | 155 | 150 |
| 4 | 1.00 | 4.00 | 530.0 | 7 | 7 | 5.5 | 5.5 | 8 | 128 | 150 | 121 | 134 | 141 | 128 | 159 | 149 | 139 |
| 5 | 1.00 | 6.00 | 530.0 | 9 | 9 | 7 | 7 | 0 | 159 | 155 | 171 | 165 | 155 | 170 | 160 | 170 | 163 |
| 6 | 2.00 | 4.00 | 470.0 | 6.5 | 5 | 4 | 4 | 7 | 178 | 181 | 164 | 184 | 188 | 183 | 191 | 184 | 184 |

APPENDIX-continued

TABLE 3

| | Shield | FB time | MM tim | MM Tem | Medium Pan Suprem | | | | | Medium Pan Supreme | | | | | | | | |
|---|---|---|---|---|---|---|---|---|---|---|---|---|---|---|---|---|---|---|
| | Hole | (min) | (min) | (° F.) | tcrst | bcrst | chs | tpng | raw | T-1 | T-2 | T-3 | T-4 | T-5 | T-6 | T-7 | T-8 | TAVG. |
| 1 | 6" | 2.00 | 4.00 | 470.0 | 0 | 4 | 3 | 3 | 8 | 154 | 141 | 161 | 170 | 152 | 167 | 157 | 162 | 158 |
| 2 | 6" | 3.00 | 6.00 | 530.0 | 0 | 8 | 7.5 | 7.5 | 0 | 195 | 170 | 155 | 171 | 180 | 182 | 190 | 169 | 177 |
| 3 | 9" | 2.00 | 6.00 | 530.0 | 3 | 7.5 | 7.5 | 7 | 0 | 177 | 188 | 194 | 185 | 191 | 195 | 189 | 195 | 189 |
| 4 | 10" | 2.00 | 6.00 | 530.0 | 3 | 8 | 8 | 7.5 | 0 | 192 | 186 | 190 | 199 | 205 | 192 | 195 | 186 | 193 |
| 5 | 12" | 2.00 | 6.00 | 530.0 | 9 | 8.5 | 8 | 8 | 0 | 187 | 179 | 185 | 203 | 202 | 203 | 193 | 197 | 194 |
| 6 | 11" | 2.00 | 6.00 | 530.0 | 7 | 8 | 8 | 7.5 | 0 | 179 | 185 | 189 | 196 | 199 | 196 | 192 | 201 | 192 |
| 7 | 11" | 2.00 | 4.00 | 530.0 | 4 | 5.5 | 5 | 5 | 8 | 149 | 148 | 152 | 160 | 147 | 163 | 148 | 171 | 155 |
| 8 | 11" | 3.00 | 4.00 | 530.0 | 5 | 5 | 6 | 6 | 5 | 170 | 173 | 167 | 181 | 159 | 156 | 176 | 182 | 171 |
| 9 | 11" | 4.00 | 4.00 | 530.0 | 7 | 7.5 | 7 | 7 | 0 | 172 | 185 | 197 | 188 | 188 | 187 | 183 | 181 | 185 |

What is claimed is:

1. A method of shielding a food product in a baking environment, the method comprising:

(a) placing a shield and a food product in close association with each other, the shield having a shape generally corresponding to the shape of the food product, the shield comprising a first region defining a plurality of apertures extending at least partially through the shield;

(b) placing the shield and food product into a baking environment;

(c) directing a first type of baking energy toward the food product, the shield being disposed between a source of the first type of baking energy and the food product;

(d) substantially blocking transmission of the first type of baking energy to the food product through the first region of the shield;

(e) directing a second type of baking energy toward the food product, the second type of baking energy being different than the first type of baking energy, the shield being disposed between a source of the second type of baking energy and the food product; and (f) substantially allowing transmission of the second type of baking energy through the first region of the shield;

wherein said first type of baking energy comprises microwave energy; further wherein said second type of baking energy comprises thermal energy transported by impinging jets of heated air to the food product, further wherein the food product comprises pizza.

2. The method of claim 1, wherein the shield further defines a transmissive region distinct from the first region, the transmissive region defining at least one open area extending entirely through the shield, the transmissive region substantially allowing transmission of both the first and second types of baking energy to the food product through the at least one open area extending entirely through the shield.

3. The method of claim 2, wherein the first region is disposed at least above an edge portion of the food product; further wherein the transmissive region is disposed at least above an inner portion of the food product.

4. The method of claim 3, wherein the food product is a pizza product.

5. The method of claim 1, wherein the apertures in the first region are of a size too small to allow microwave energy through the apertures; further wherein the second type of baking energy passes through the apertures.

6. The method of claim 1, wherein the baking environment is created at least in part by an impingement oven.

7. The method of claim 1, wherein (a) comprises manually placing the shield over the food product before (b); further wherein (b) comprises placing the shield and food product together into the baking environment.

8. The method of claim 1, wherein (a) comprises placing the shield on top of a pan in which the food product is disposed.

9. The method of claim 1, further comprising:

repeating (a)–(f) using a second shield and second food product, the second shield and second food product having a substantially different size than the first shield and first food product;

wherein the first and second food products are baked at substantially the same temperature for substantially the same length of time.

10. The method of claim 1, wherein the food product defines a substantially horizontal plane, the impinging jets of heated air impinging upon the food product in a direction substantially perpendicular to the substantially horizontal plane.

11. The method of claim 1, further comprising supporting the food product with a cooking utensil, the shield being constructed to engage the cooking utensil, and placing the shield onto the cooking utensil.

12. The method of claim 11, wherein the cooking utensil comprises a rim, the shield comprising a stepped section for supporting the shield on the rim of the cooking utensil.

13. In combination, apparatus for creating a baking environment, a shield for a food product in the baking environment, and a cooking utensil for supporting the food product, the combination comprising:

a shield comprising a first region defining a plurality of apertures extending at least partially through the shield, the shield being constructed for close association with a food product; and apparatus for creating a baking environment, the apparatus comprising structure for directing a first type of baking energy toward the food product, the apparatus further comprising structure for directing a second type of baking energy toward the food product, the second type of baking energy being different than the first type of baking energy; and a cooking utensil for supporting the food product, the shield being constructed for support by the cooking utensil; wherein:

the apparatus, shield, cooking utensil and food product are disposed such that while the first type of baking energy is being directed toward the food product, the shield is disposed between a source of the first type of baking energy and the food product;

the apparatus, shield, cooking utensil and food product are disposed such that while the second type of baking energy is being directed toward the food product, the shield is disposed between a source of the second type of baking energy and the food product;

the shield is constructed to substantially block transmission of the first type of baking energy to the food product through the first region of the shield;

the shield is constructed to substantially allow transmission of the second type of baking energy through the first region of the shield;

the first type of baking energy is one of light energy and microwave energy; and the second type of baking energy is thermal energy transported by impinging jets of heated air to the food product.

14. The combination of claim 13, wherein the shield further defines a transmissive region, the transmissive region substantially allowing transmission of both the first and second types of baking energy to the food product.

15. The combination of claim 14, wherein the first region substantially surrounds the transmissive region.

16. The combination of claim 13, wherein the apparatus comprises a conveyor oven.

17. The combination of claim 13, wherein the apparatus comprises a combination microwave and impingement oven.

18. The combination of claim 13, wherein the apparatus comprises a combination light-energy and impingement oven.

19. The combination of claim 13, wherein the shield comprises a stepped sidewall constructed for engaging the cooking utensil.

20. The combination of claim 19, wherein the cooking utensil comprises a pan.

21. The combination of claim 19, wherein the stepped sidewall comprises an outdented portion for contacting the cooking utensil.

22. The combination of claim 21, further comprising an upstanding portion connected to the outdented portion for grasping by a gripping tool.

23. A shield for a food product in a baking environment, the shield being constructed for close association with a food product and having a shape generally corresponding to the food product, the shield comprising a first region defining a plurality of apertures extending at least partially through the shield, the shield being constructed to substantially block transmission of a first type of baking energy to the food product through the first region of the shield, the shield further being constructed to substantially allow transmission of a second type of baking energy through the first region of the shield, the first type of energy being different than the second type of energy, wherein the shield is constructed to be disposed between the food product and a source of the first type of baking energy while the first type of baking energy is being directed toward the food product, further wherein the shield is constructed to be disposed between the food product and a source of the second type of baking energy while the second type of baking energy is being directed toward the food product; the first type of energy being one of light energy and microwave energy, the second type of energy being thermal energy transported by impinging jets of heated air to the food product, further wherein the shield includes an outdented portion for receiving the edge of a cooking utensil, the cooking utensil supporting the food product.

24. The shield of claim 23, wherein the shield further defines a transmissive region, the transmissive region substantially allowing transmission of both the first and second types of baking energy to the food product.

25. The shield of claim 24, wherein the first region substantially surrounds the transmissive region.

26. The shield of claim 23, wherein the shield comprises first and second layers, the first layer being a microwave-reflective layer.

27. The shield of claim 26, wherein the second layer comprises a ceramic material.

28. The shield of claim 23, wherein the shield is constructed to be supported on a pan supporting the food product.

* * * * *